United States Patent
Wigren

(10) Patent No.: US 12,436,223 B2
(45) Date of Patent: Oct. 7, 2025

(54) METHODS AND APPARATUS FOR POSITIONING OF A MOVING WIRELESS DEVICE

(71) Applicant: Telefonaktiebolaget LM Ericsson (publ), Stockholm (SE)

(72) Inventor: Torbjörn Wigren, Uppsala (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 358 days.

(21) Appl. No.: 18/014,524

(22) PCT Filed: Jul. 10, 2020

(86) PCT No.: PCT/SE2020/050723
§ 371 (c)(1),
(2) Date: Jan. 5, 2023

(87) PCT Pub. No.: WO2022/010392
PCT Pub. Date: Jan. 13, 2022

(65) Prior Publication Data
US 2023/0266428 A1 Aug. 24, 2023

(51) Int. Cl.
G01S 5/02 (2010.01)
G01S 5/00 (2006.01)

(52) U.S. Cl.
CPC ............ *G01S 5/0246* (2020.05); *G01S 5/017* (2020.05); *G01S 5/0294* (2013.01)

(58) Field of Classification Search
CPC ....... G01S 5/0246; G01S 5/017; G01S 5/0294
USPC ......................................................... 342/451
See application file for complete search history.

(56) References Cited

U.S. PATENT DOCUMENTS

| | | | |
|---|---|---|---|
| 10,809,388 B1* | 10/2020 | Carcanague | G01S 19/252 |
| 10,838,071 B1* | 11/2020 | Dybdal | G01S 19/30 |
| 2001/0004601 A1 | 6/2001 | Drane et al. | |
| 2019/0346860 A1 | 11/2019 | Houts et al. | |
| 2021/0282310 A1* | 9/2021 | Birkland | B60W 50/14 |
| 2025/0062842 A1* | 2/2025 | Park | H04L 25/0222 |

OTHER PUBLICATIONS

International Search Report and Written Opinion of the International Searching Authority for PCT International Application No. PCT/SE2020/050723 dated May 27, 2021.
Branislav Kusy et al., "RF Doppler Shift-Based Mobile Sensor Tracking and Navigation," ACM Transactions on Sensor Networks, vol. 7, No. 1, Article 1, Aug. 2010, pp. 1-32.

(Continued)

*Primary Examiner* — Harry K Liu
(74) *Attorney, Agent, or Firm* — Sage Patent Group

(57) ABSTRACT

A method of determining a two-dimensional position of a moving wireless device is provided. The method comprises obtaining, for each of three or more base stations, one or more measurements of a carrier frequency offset for one or more signals sent between the moving wireless device and the respective base stations. The method further comprises inputting the carrier frequency offset measurements into a model to determine a two-dimensional position of the moving wireless device, in which inputs to the model do not include range measurements for the moving wireless device with respect to the three or more base stations.

20 Claims, 11 Drawing Sheets

(56) References Cited

OTHER PUBLICATIONS

Ari Kangas et al., "Chapter draft: Positioning in LTE," Chapter 32, Book: Handbook of Position Location—Theory, Practice and Advances, 2nd Edition, Feb. 2019, 71 pages.
Yaakov Bar-Shalom et al., "Estimation and Tracking: Principles, Techniques, and Software," 1993, published by Artech House, Inc., Chapter 11, pp. 461-470.

* cited by examiner

METHODS AND APPARATUS FOR POSITIONING OF A MOVING WIRELESS DEVICE

CROSS REFERENCE TO RELATED APPLICATION

This application is a 35 U.S.C. § 371 national stage application of PCT International Application No. PCT/SE2020/050723 filed on Jul. 10, 2020, the disclosure and content of which is incorporated by reference herein in its entirety.

TECHNICAL FIELD

Embodiments of the present disclosure relate to positioning, and particularly to methods and apparatus for determining a two-dimensional position of a wireless device.

BACKGROUND

Positioning information is employed for a diverse range of use-cases in wireless communications networks. For example, large scale movement patterns such as traffic flows or crowd movements may be tracked by monitoring the positions and velocities of multiple wireless devices. Positioning information may also be used to improve network connections. For example, the position and velocity of a wireless device may be used to predict a trajectory for the wireless device. This, in turn, may be used to determine when to perform handover, thereby reducing the risk that a rapidly moving wireless device may lose connection before handover is initiated.

An example architecture for positioning in a Long Term Evolution (LTE) network is shown in FIG. 1. In LTE, a positioning node (such as, for example, an Evolved Serving Mobile Location Centre, E-SMLC, or a location server) may configure a target device to perform one or more positioning measurements for a wireless device. The number of positioning measurements, type of measurements and/or which device(s) are used as a target device may depend on the positioning method. For example, in Uplink Time Difference of Arrival (U-TDOA) methods, the positioning node may configure a base station which is serving a wireless device to perform one or more measurements to determine a position of the wireless device. In Observed (Downlink) Time Difference of Arrival (O-TDOA) methods, the positioning node may configure the wireless device itself to perform the one or more measurements.

The positioning measurements may be used by the target device or the positioning node to determine the location of the wireless device. The positioning node may communicate with a wireless device using an LTE positioning protocol (LPP) and with an eNodeB using an LTE positioning protocol annex (LPPa).

The architecture shown in FIG. 1 comprises a LoCation Services (LCS) client, an LCS target and an LCS server. An LCS Client is a software and/or hardware entity that interacts with an LCS Server to obtain location information for one or more LCS targets (e.g. the entities for which positions are determined). LCS clients may also reside in LCS targets. The LCS Server is a physical or logical entity that manages positioning for an LCS target by collecting measurements and other location information, assisting in measurements when necessary, and estimating the LCS target location.

A method for determining the position of the LCS target may begin with the LCS Client sending a request to the LCS Server to obtain location information. LCS Server processes and serves the received request and sends the position estimate and optionally a velocity estimate to the LCS Client. The position estimate may be determined by a positioning service (such as an E-SMLC or a Secure User Plane Location, SUPL, Location Platform) or a wireless device, for example. The former approach corresponds to a user equipment (UE)-assisted positioning mode when it is based on wireless device measurements, whilst the latter corresponds to a UE-based positioning mode.

Those skilled in the art will appreciate that various positioning methods may be used in wireless communication networks. For example, an Assisted Global Navigation Satellite System (A-GNSS) may use specialist hardware in a wireless device for positioning. Other exemplary techniques include U-TDOA and O-TDOA. Further information relating to positioning methods in communications networks may be found in "Positioning in LTE", A. Kangas, I. Siomina and T. Wigren, Handbook of Position Location: Theory, Practice and Advances, 2nd Ed., February 2019.

However, each of these existing techniques has various advantages and disadvantages. For example, a user or network vendor may choose to disable the specialist hardware required for A-GNSS measurements, which can prevent the location of a wireless device from being determined. Positioning methods using A-GNSS may also be less effective indoors, and any positioning information that is obtained using A-GNSS is typically obtained in either the wireless device or in a positioning node (e.g. in a satellite), which means that it may not be accessible to a base station serving the wireless device.

Both U-TDOA and O-TDOA can require using at least four base stations. In addition, O-TDOA relies on measurements performed by the wireless device, which means that a user or network vendor may prevent this positioning method from being used.

Existing positioning techniques thus have disadvantages which may limit or restrict their utility in wireless communication networks.

SUMMARY

Embodiments of the present disclosure seek to address these and other problems.

In one aspect, a method of determining a two-dimensional position of a moving wireless device is provided. The method comprises obtaining, for each of three or more base stations, one or more measurements of a carrier frequency offset (CFO) for one or more signals sent between the moving wireless device and the respective base stations. The method further comprises inputting the CFO measurements into a model to determine a two-dimensional position of the moving wireless device, wherein inputs to the model do not include range measurements for the moving wireless device with respect to the three or more base stations.

In a further aspect, the disclosure provides an apparatus to perform the method recited above. A further aspect provides a computer program for performing the method recited above. A computer program product, comprising the computer program, is also provided.

A still further aspect of the present disclosure provides an apparatus for determining a position of a moving wireless device. The apparatus comprises a processor and a machine-readable medium, in which the machine-readable medium contains instructions executable by the processor such that the apparatus is operable to: obtain, for each of three or more base stations, one or more measurements of a CFO for one or more signals sent between the moving wireless device and the respective base stations. The apparatus is further operable to input the CFO measurements into a model to determine a two-dimensional position of the moving wireless device, in which inputs to the model do not include range measurements for the moving wireless device with respect to the three or more base stations.

Conventionally, positioning methods for wireless devices require the use of range measurements such as, for example, round trip travel time measurements or radar measurements. In contrast, the present disclosure provides methods and apparatus for determining a moving wireless device's position without requiring the use of any range measurements for the wireless device.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 2:
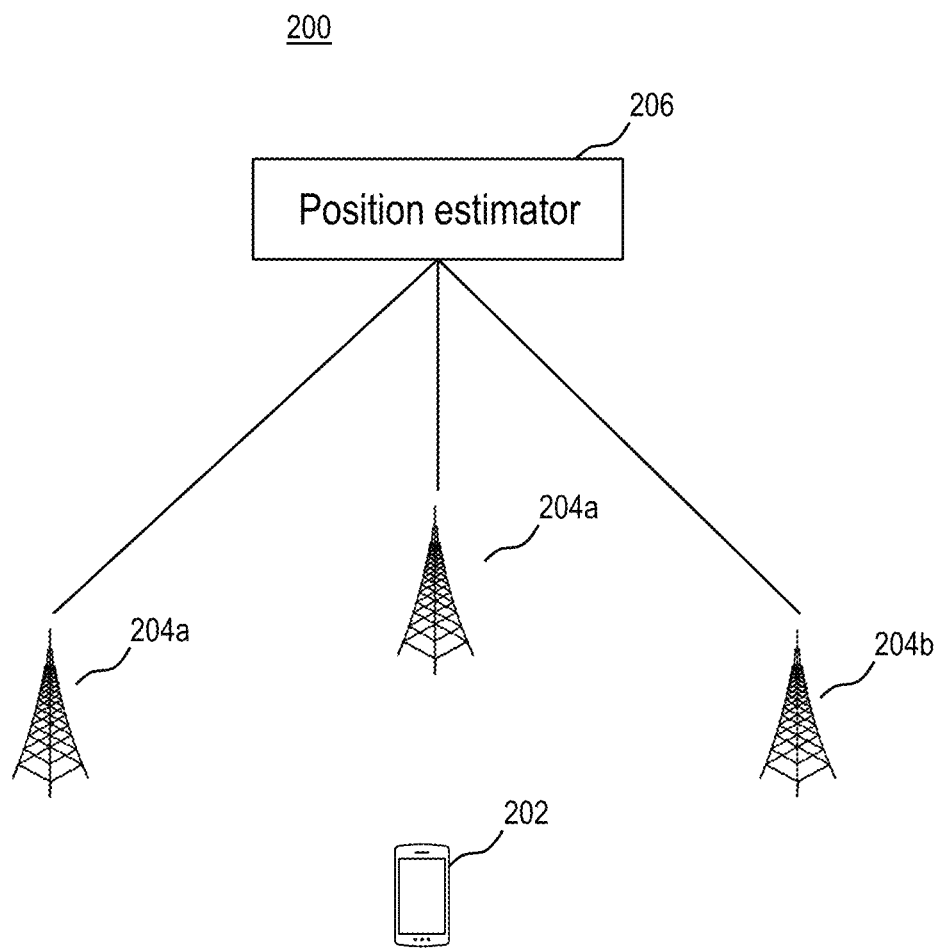
FIG. 2 shows a wireless communication network according to embodiments of the disclosure.

FIG. 2 shows a wireless communication network 200 according to embodiments of the disclosure. The wireless communication network 200 may implement any suitable wireless communications protocol or technology, such as Global System for Mobile communication (GSM), Wideband Code-Division Multiple Access (WCDMA), Long Term Evolution (LTE), New Radio (NR), WiFi, WiMAX, or Bluetooth wireless technologies. In one particular example, the network 200 forms part of a cellular telecommunication network, such as the type developed by the $3^{rd}$ Generation Partnership Project (3GPP). Those skilled in the art will appreciate that various components of the network 200 are omitted from FIG. 2 for the purposes of clarity.

The communications network 200 comprises a first base station 204a, a second base station 204b and a third base station 204c (204 collectively). Each of the base stations 204 may be, for example, an evolved Node B (eNB) or a next generation Node B (gNB). The first base station 204a is in radio communication with a wireless device 202. The wireless device 202 may be, for example, a user equipment, a mobile station, or any other suitable wireless device. In particular examples, the wireless device may be integrated in a vehicle (e.g. an autonomous vehicle).

The wireless device 202 is connected to a core network via the base station 204a and a backhaul network (not illustrated). The first base station 204a may be, for example, the serving base station for the wireless device 202. Although only three base stations 204a, 204b, 204c (collectively, 204) are shown, the skilled person will appreciate that the network 200 may in general contain three or more base stations 204.

Existing methods for determining a position of a wireless device typically require using range related measurements such as, for example, time of arrival measurements. These techniques often require high accuracy time synchronisation, and may also necessitate additional signalling between the wireless device and other nodes in the network. Some positioning techniques may also need to be tailored to specific base stations requiring, for example, cell-specific models to be trained.

Aspects of the disclosure address these and other problems by using carrier frequency offset measurements to determine a position of a moving wireless device.

Due to the Doppler effect, any movement of a wireless device towards or away from a base station changes the frequency of signals received at, for example, the base station from the wireless device. A base station measuring the frequency of a signal transmitted from the wireless device at a carrier frequency, $f_c$, would thus determine the Doppler frequency, $f_D$, of the signal, the difference between the carrier frequency and the measured, received frequency, to be $$f_D = -\frac{v_s}{c}f_c$$

in which $v_s$ is the (departing) velocity of the wireless device with respect to the base station and c is the speed of light. The Doppler frequency may also be referred to as the carrier frequency offset (CFO).

According to embodiments of the present disclosure, measurements of a CFO between each of three or more base stations and a moving wireless device are used to determine the two-dimensional position of wireless device. In particular, CFO measurements performed on signals sent between the wireless device and three or more base stations are input to a model to determine the wireless device's two-dimensional position. The CFO measurements are used in the absence of any range measurements of the wireless device with respect to the three or more base stations (e.g. any other measurements indicative of a distance between the wireless device and the three or more base stations).

Methods of the present disclosure determine the position of a wireless device in the absence of any range measurements such as, for example, round-trip travel time measurements or pathloss measurements. These methods determine two-dimensional position estimates to a high degree of accuracy and may have a higher availability indoors than existing positioning methods. These methods may be particularly advantageous for ground-based or grounded wireless devices which primarily move in two dimensions (e.g. they may have limited vertical movement).

In particular examples, CFO measurements may be performed on signals sent as part of legacy signalling procedures. Aspects of the present disclosure may thus enable a wireless device to be tracked without requiring any additional signalling from the wireless device.

The CFO measurements may additionally be used to determine a two-dimensional velocity of the wireless device. Thus, for example, the model may output a two-dimensional kinematic state estimate for the wireless device, in which the kinematic state comprises the two-dimensional position of the moving wireless device and a two-dimensional velocity of the moving wireless device. Those skilled in the art will appreciate that, in general, the velocity of a UAV may be a vector and thus may be indicative both of a speed of the UAV and its direction of movement.

The method may be performed iteratively such that, for example, the two-dimensional position (or kinematic state) of the moving wireless device at a first time instance is itself determined (e.g. predicted) based on an estimate of the two-dimensional position of the moving wireless device at a second, earlier time instance. The two-dimensional position of the wireless device may thus be monitored over time, e.g., as it travels along a trajectory, at each of a plurality of time instances, by initially estimating the position of the wireless device based on its previous position and then updating the initial estimate based on CFO measurements.

CFO measurements that are performed on signals transmitted between the wireless device 202 and the three base stations 204 are input to a model to determine a two-dimensional position of the wireless device 202. For example, each of the base stations 204 may perform CFO measurements on signals sent by the wireless device 202. Alternatively, the wireless device 202 may perform CFO measurements on signals sent by each of the base stations 204.

In particular examples, the CFO measurements may be the only measurements that are indicative of the wireless device's position that are input to the model. However, quantities other than measurements may be input to the model. Thus, for example, the model may further take an estimate of an earlier position of the wireless device as input. However, in the embodiments of the invention, the model may not take a measurement of a distance between the wireless device and one of the base stations 204 (e.g. a range measurement) as input.

The method may be performed by one of the three or more base stations 204. In one example, the wireless device 202 performs CFO measurements on signals received from the three or more base stations 204 and sends the CFO measurements to the first base station 204a. In another example, the first base station 204a may perform CFO measurements on signals sent by the wireless device 202. The first base station 204a may also receive respective CFO measurements from each of the other base stations 204b, 204c (e.g. respective CFO measurements performed by the other base stations 204b, 204c). The first base station 204a may input the CFO measurements for all of the base stations 204 into the model.

In alternative embodiments, the method may be performed by another node in the network 200, such as those nodes that are in or connected to the core network in the communications network 200. In the illustrated example, the network 200 further comprises a position estimator 206, which may form part of the core network (e.g. the position estimator 206 is implemented in a core network node), or any other part of the network. The position estimator 206 may receive one or more respective CFO measurements for each of the three base stations 204 and inputs the CFO measurements into a model to determine the two-dimensional position of the wireless device 202. The base stations 204 may perform the CFO measurements on signals sent by the wireless device 202. The position estimator 206 may, for example, receive the CFO measurements directly from the base stations 204.

In alternative examples, the wireless device 202 may perform the CFO measurements. In this case, the position estimator 206 may receive the CFO measurements from the wireless device 202 via one of the three or more base stations 204 (e.g. via a serving base station for the wireless device 202). In another example, one base station may collate CFO measurements performed by the three or more base stations 204 and send the collated CFO measurements to the positioning node 206.

Aspects of the present disclosure thus provide a method of determining a two-dimensional position of a wireless device using CFO measurements.

Figure 3:
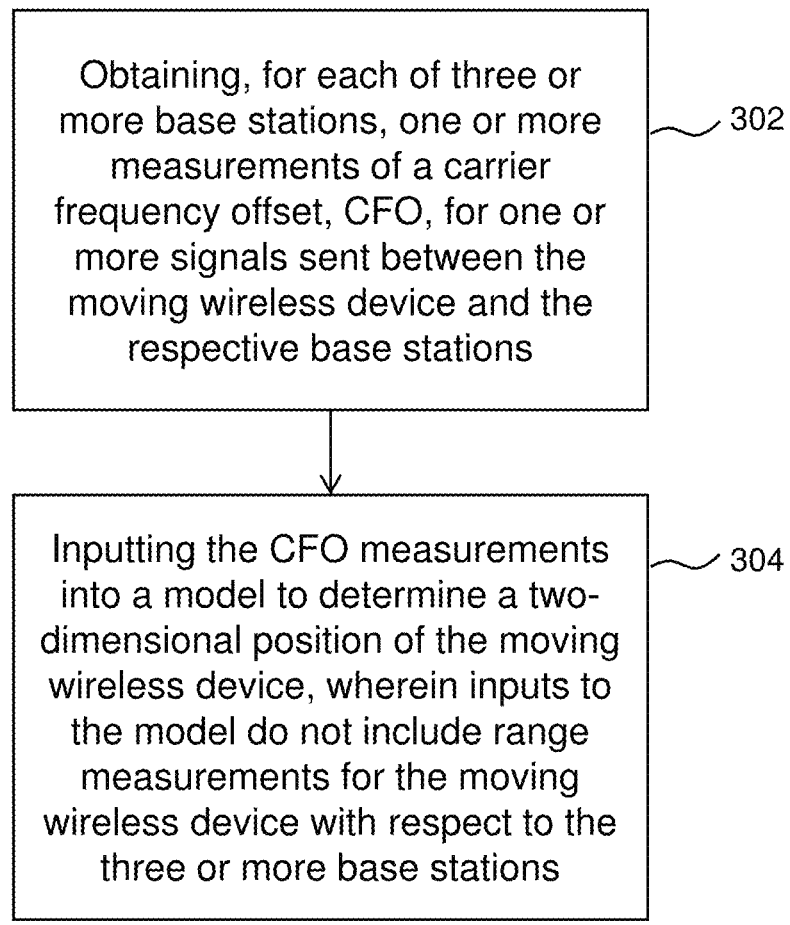
FIG. 3 is a flowchart of a method of determining a position of a moving wireless device according to embodiments of the disclosure.

FIG. 3 is a flowchart of a method 300 of determining a position of a moving wireless device according to embodiments of the disclosure. The wireless device may be, for example, the wireless device 202 described above in respect of FIG. 2. The method 300 may be performed by one or more nodes in a wireless communications network (e.g. a communications network comprising the wireless device 202). For example, the method 300 may be performed by a base station (e.g. one of the base stations 204 described above in respect of FIG. 2) or one or more nodes in a core network or connected to a core network (e.g. the position estimator 206 described above in respect of FIG. 2).

The method begins in step 302, in which, for each of three or more base stations 204, one or more measurements of a CFO for one or more signals sent between the moving wireless device 202 and the respective base station are obtained. The three or more base stations may be located at different positions (e.g. they may not be co-located). The three or more base stations may be the three or more base stations 204 described above in respect of FIG. 2, for example. The three or more base stations 204 may comprise, for example, any base station capable of sending a signal that can be received by the wireless device 202 and/or any base station that is capable of receiving a signal from the wireless device 202. That may include, for example, a base station that is capable of eavesdropping on a signal sent from the wireless device 202 to another node (e.g. another base station).

In particular examples, the three or more base stations 204 may comprise a serving base station for the wireless device 202 (e.g. the base station 204a) and two or more neighbouring base stations for the wireless device 202 (e.g. the base stations 204b, 204c). Thus, for example, the two or more neighbouring base stations 204b, 204c may eavesdrop on a signal sent from the wireless device 202 to its serving base station 204a (e.g. an uplink signal) to determine a CFO for the wireless device 202. In alternative examples, more than one of the base stations 204 may serve the wireless device 202, e.g., in a multi-connectivity configuration.

As described above, movement of a wireless device towards or away from a base station changes the frequency of signals received at, for example, the wireless device from the base station. A signal transmitted at a carrier frequency, $f_c$, may thus be received at a different frequency in which the difference (the Doppler frequency $f_D$) between the carrier frequency and the received frequency depends on a relative velocity of the receiver with respect to the transmitter. Therefore, a signal s(t) transmitted to a base station is received shifted as $e^{i2\pi\Delta ft}s(t)$ with frequency shift $\Delta f$. Correspondingly, the propagation channel h(t;τ), in which t is a time and τ is a delay, may be shifted according to $e^{i2\pi\Delta ft}h(t;\tau)$.

As noted above, the Doppler frequency may be referred to as the CFO. Thus, measurement of a CFO may refer to measurement of a shift or difference between a frequency of a signal as measured by its transmitter (e.g. the carrier frequency) and the frequency of the signal as measured by its receiver. Those skilled in the art will further appreciate that the frequency measured at the receiver by itself may be used for this purpose, particularly where the transmitted frequency is the same for signals received at each of the base stations 204. Accordingly, references to CFO or CFO measurements may be taken to refer to, for example, measurements of the received frequency or measurements indicative of a difference between the received frequency and the carrier frequency.

The CFO measurements may be, for example, performed by the wireless device 202. In this case, step 302 may comprise receiving CFO measurements from the wireless device 202. For example, the method may be performed by a serving base station for the wireless device 202 and the serving base station may receive the CFO measurements performed by the wireless device 202 on signals sent from the three or more base stations.

In other embodiments, the CFO measurements may be performed by the three or more base stations 204. In this case, the method may comprise receiving CFO measurements from each of the three or more base stations 204. For example, the method may be performed by a core network node (e.g. the positioning node 206) and the core network node may receive CFO measurements from each of the base stations 204. In another example, the method may be performed by one of the three or more base stations 204. In which case, one base station may receive CFO measurements from each of the other base stations and also perform CFO measurements on a signal received from the wireless device 202.

The one or more signals used for determining CFO measurements may be transmitted to (e.g. intended for) a single cell such as, for example, a serving cell of the wireless device. However, in particular embodiments, other base stations (e.g. such as base stations other than a serving base station) may eavesdrop on the signal and performed CFO measurements on the eavesdropped signal. Thus multiple base stations may perform a CFO measurement on a signal sent from a wireless device.

The CFO measurements obtained in step 302 may be performed on any suitable signal sent between the wireless device and the respective base station. The signals may comprise, for example, one or more uplink signals sent by the moving wireless device. The CFO measurements for each of the three or more base stations may thus be performed by the respective base station on the one or more uplink signals.

In particular embodiments, one or more signals sent over an uplink channel such as a Physical Uplink Control CHannel (PUCCH) or a Physical Uplink Shared CHannel (PUSCH) may be used for determining a CFO. In embodiments in which the communications network 200 is an LTE network, one or more PUCCH signals may be used for measuring a CFO, for example. The skilled person will appreciate that there may be different advantages associated with measuring a CFO on a particular channel. For example, signals sent over the PUCCH may be sent without dynamic scheduling. In another example, measurements using PUSCH enable a received energy to be varied to obtain a minimum signal strength to obtain the phase $\varphi_i$ at a time $t_i$ to a minimum accuracy required to determine the CFO.

In particular examples, one or more reference signals (such as, for example, Sounding Reference Signals, SRSs) may be used for measuring a CFO. In embodiments in which the communications network 200 is an NR network, SRSs transmitted on the PUSCH may be used to measure a CFO. For example, up to four adjacent symbols may be scheduled as SRSs, and the SRSs may be used to measure a CFO.

The CFO, $\Delta f$, of a channel may be determined using channel estimates for two different reference signals (e.g. reference signals transmitted on the PUSCH) with respective phases $\hat{\varphi}_1, \hat{\varphi}_2$:

$$\Delta f = \frac{\hat{\varphi}_2 - \hat{\varphi}_1}{(2\pi\Delta T)^2},$$

in which $\Delta T = t_2 - t_1$ is the time difference between the two channel estimates. The estimation accuracy depends on both the accuracy of $\hat{\varphi}_i$ and $\Delta T$:

$$\sigma_f^2 = \frac{2\sigma_\varphi^2}{(2\pi\Delta T)^2},$$

in which $\sigma_f^2$ and $\sigma_\varphi^2$ are the variances for the frequency shift estimate $\Delta f$ and for the phase estimate $\hat{\varphi}$, respectively. The variance $\sigma_\varphi^2$ may decrease with increasing signal-to-noise ratio.

In particular examples, Fourier transformations that are done when Orthogonal Frequency Division Multiplexing (OFDM) reception is performed (e.g. in a 4G or a 5G cellular system) may be used to measure a CFO. The Fourier transform pair $$e^{iw_0 t}f(t) \leftrightarrow F(j(w-w_0))$$

may be exploited in the uplink to compare the phase shift between pilot signals (e.g. on two OFDM symbols) after each other.

Thus, CFO measurements may be performed by measuring one or more reference signals transmitted between the wireless device and the three or more base stations.

As noted above, in particular embodiments, CFO measurements may be performed by each of the three or more base stations on one or more signals sent by the wireless device. A wireless device may be assigned a target power per resource block for signals sent to its serving cell. The power target may be set to a minimum signal-to-noise ratio in the desired receiver (e.g. at the serving base station) whilst minimising interference in neighbouring cells. Thus, the signal strength at which neighbouring base stations receive signals from the wireless device may be too weak (e.g. to low) in order to obtain accurate CFO measurements. In some examples, signal strength may be improved by increasing a number of resource blocks that are scheduled for a particular channel. For example, the number of uplink resource blocks scheduled for PUSCH for a wireless device may be increased. Since a total received signal power is proportional to the number of granted resource blocks, the power increases as a resource block allocation is increased, subject to any power limitation or constraints at the wireless device.

Another approach for increasing the signal strength and thereby the accuracy of CFO measurements is to average CFO measurements performed on multiple signals. Accordingly, in particular embodiments, the CFO measurements for a base station in the three or more base stations may comprise an average of a plurality of CFO measurements performed on signals sent between the moving wireless device and the respective base station. For example, a wireless device may be granted uplink transmissions in multiple subframes. A base station receiving the uplink transmissions may perform CFO measurements on signals in each of the slots and average the results. In particular examples, the averaging may be performed using a one-tap Infinite Impulse Response (IIR) filter using $$\overline{f}_n = \alpha \hat{f}_n + (1-\alpha)\overline{f}_{n-1},$$

in which $\hat{f}_n$ and $\overline{f}_n$ are the $n^{th}$ sample of the unfiltered and filtered frequency shift estimates, respectively, and a is a constant, $0<\alpha<1$.

Signals sent between a moving wireless device and a base station thus exhibit a frequency offset which is measurable at the receiver. The present disclosure provides methods in which measurements of this frequency offset, referred to as a carrier frequency offset (CFO), are used to determine a position of a moving wireless device.

The method progresses to step 304, in which the position of the moving wireless device 202 is determined by inputting the CFO measurements into a model.

As noted above, CFO measurements performed on signals sent between the wireless device 202 and a respective base station 204 are sensitive to a relative velocity between the wireless device 202 and the base station 204. The skilled person will appreciate that additional factors may also affect a CFO of a signal sent between a wireless device 202 and a respective base station 204. For example, a frequency mismatch between a transmitter and a receiver may also cause an offset in a carrier frequency (e.g. inter-carrier interference). That is, an oscillator at the transmitter may oscillate at a different frequency to an oscillator in a receiver (e.g. the respective sampling clocks at the transmitter and the receiver may operate at different frequencies), which can cause a CFO. According to the present disclosure, other factors (e.g. factors other than the Doppler effect) that contribute to a carrier frequency effect are modelled as a bias in CFO measurements. This bias may be the same for each of the three or more base stations. In particular examples, this CFO bias may be estimated using the CFO measurements for the three or more base stations.

A CFO measurement, z, performed at a time $t_k$ on signals transmitted between a moving wireless device and a base station depends on the relative speed of the moving wireless device and the CFO bias according to:

$$z(t_k) = -\frac{f_c}{c}v_s(t_k) + x_{bias}(t_k),$$

in which $v_s(t_k)$ is a relative speed of the moving wireless device with respect to the base station (e.g. the speed of the wireless device if the base station is stationary), c is the speed of light, $f_c$ is the carrier frequency and $x_{bias}(t_k)$ is the CFO bias. In particular examples, the CFO bias may be assumed to be the same for each of the three or more base stations.

For a wireless device at a position r with rate ṙ, and a (stationary) base station at position $r_s$, the relative velocity of the wireless device with respect to the base station is given by:

$$v_s(\hat{x}) = \frac{(\hat{r} - r_s)}{\|\hat{r} - r_s\|} \cdot \dot{r} = \frac{(\hat{x}_1 - x_{s,1})\hat{x}_3 + (\hat{x}_2 - x_{s,2})\hat{x}_4}{\sqrt{(\hat{x}_1 - x_{s,1})^2 + (\hat{x}_2 - x_{s,2}) + (0 - x_{s,3})}},$$

in which $x_{s,1}$, $x_{s,2}$, $x_{s,3}$ are the respective coordinates of the base station site, $\hat{x}_1, \hat{x}_2$ are the coordinates of the moving wireless device 302 and $\hat{x}_3, \hat{x}_4$ are the components of the velocity of the wireless device 302. Thus $x_{s,3}$ is the height of the respective base station and the wireless device is assumed to be on the ground (e.g. the altitude of the wireless device is assumed to be zero).

The CFO for signals transmitted between the wireless device and a respective base station may thus be given by $$\hat{z}^i(\hat{x}^i) = h(\hat{x}^i) = -\frac{f_c}{c}\frac{\left((\hat{x}_1^i - x_{s,1})\hat{x}_3^i + (\hat{x}_2^i - x_{s,2})\hat{x}_4^i\right)}{\sqrt{(\hat{x}_1^i - x_{s,1})^2 + (\hat{x}_2^i - x_{s,2})^2 + (0 - x_{s,3})^2}} + \hat{x}_5^i.$$

This relation may be referred to as the measurement equation. The measurement equation relates the observable, the CFO z, to the parameters to be determined (e.g. the two-dimensional position of the moving wireless device 302 and preferably also the velocity of the moving wireless device 302).

It is apparent from the measurement equation that a CFO measurement for signals transmitted between the moving wireless device 302 and a respective base station is sensitive to both the velocity of the moving wireless device 302 and the relative position of the wireless device 302 with respect to the base station 304. CFO measurements may thus be used to determine at least the position of the moving wireless device 302 and may additionally be used to determine the velocity of the wireless device 302. In particular embodiments, the CFO bias may also be determined from the CFO measurements. Alternatively, the CFO bias may be, for example, be measured and compensated for by other means in the at least three or more base stations 304.

The skilled person will appreciate that the methods described herein apply only when the wireless device 202 is moving. When the wireless device 202 is stationary, the measurement equation reduces to $$\hat{z}(\hat{x}) = x_{bias},$$

which means that any measurable CFO will not be indicative of a position of the wireless device 202.

As stated above, step 304 comprises inputting the CFO measurements into a model to determine the position of the wireless device 202. In particular examples, the position of the wireless device 202 may be determined by inputting the CFO measurements into an extended Kalman filter. Thus, for example, the measurement equation provided above may be used to predict respective CFO measurements for each of the three or more base stations 204 based on an initial estimate of the two-dimensional position of the wireless device 202. A difference between the CFO measurements obtained in step 302 and the predicted CFO measurements (e.g. a measurement residual) may be used to determine a position of the wireless device 202 (e.g. to update the position estimate for the wireless device 202).

In further examples, the wireless device 202 is modelled as being in one of a plurality of movement modes, in which each of the plurality of movement modes is associated with a respective extended Kalman filter in a plurality of extended Kalman filters. The method may thus further comprise inputting the CFO measurements into the plurality of extended Kalman filters and combining one or more outputs of the plurality of extended Kalman filters to determine the position of the wireless device 202 according to an interacting-multiple-model filtering process. This is described in more detail below in respect of FIG. 4.

As noted above, although the present disclosure is primarily concerned with determining the two-dimensional position of a moving wireless device, the methods described herein may additionally be used to determine a velocity of the wireless device. Embodiments described herein may be used to determine a kinematic state of a moving wireless device, in which the kinematic state comprises at least the position of the wireless device and a velocity of the wireless device and may also include an acceleration of the wireless device. Thus, for example, the kinematic state of a wireless device may consist of a two-dimensional position of the wireless device and a two-dimensional velocity of the wireless device, and also potentially a two-dimensional acceleration of the wireless device.

As noted above, there are various methods for determining the kinematic state of a wireless device.

In some exemplary methods, a wireless device is modelled as having a plurality of possible movement modes. Thus, the wireless device may, at a given instance in time, be in one of the plurality of movement modes. For example, a wireless device may have a constant velocity mode (e.g. for movement along a straight line) and a manoeuvre mode (e.g. for turning). The movement modes may assume, for example, that the wireless device moves in a plane. For example, the altitude or height of the wireless device may be assumed to be constant (e.g. the wireless device may be assumed to remain on the ground). By taking into account the different movement modes of a wireless device (e.g. the particular ways in which the wireless device is capable of flying), more accurate kinematic state estimates for the wireless device may be obtained.

One method for determining the kinematic state of a wireless device with multiple movement modes is to determine a joint probability distribution of the kinematic state of the wireless device. This kinematic state estimate may be propagated forward in time using the Fokker-Planck partial differential equation. Multi-dimensional integration may be used to obtain the posterior probability kinematic state distribution from the likelihood of the measurement and the prior probability distribution (e.g. a part of a Bayesian inference process). However, this can be computationally expensive, and may be particularly memory intensive.

A Bayesian interference calculation may be approximated using particle filtering, in which the probability density functions of the estimation problem are discretized in terms of individual "particles" (e.g. representing a form of sampling). A nonlinear dynamic model may be estimated by handling the dynamics and updating (e.g. iterating forwards in time) of each particle state individually. Resampling may be performed by re-distribution, removal or addition of particles, depending on a difference between a predicted state and a measured state. In this way, a particle filter may be used to estimate systems with multiple modes, since the nonlinear dynamics of each particle can depend on its state.

An alternative approach for determining the kinematic state of a wireless device involves modelling and estimating each mode separately, and then selecting a particular movement mode. For example, a wireless device may be assumed to have two movement modes: a constant velocity mode (e.g. straight line movement) and a manoeuvre mode. The manoeuvre mode may be modelled by a leaky constant velocity movement that responds to measurements with higher agility than the constant velocity mode. A manoeuvre detector may be used to select a manoeuvre filter based on which filter provides a close match to any measurements. After a manoeuvre is terminated, a re-initialised constant velocity movement mode may be used for kinematic state estimation. Whilst this is a simple, robust approach, problems can arise when selecting threshold values for the manoeuvre detector.

An interactive-multiple-model (IMM) filter or process provides another alternative approach. When used to determine a kinematic state estimate for a wireless device, the IMM process assumes that the wireless device moves according to one of a finite number of modes. The modes may differ in their noise levels and/or structure. For example, modes may have different state dimensions and different unknown inputs. At a time, k, the state estimate may be computed (e.g. in parallel) under each possible mode using r filters. Each filter uses a different combination of previous mode-conditioned estimates (e.g. a different combination of state estimates from a previous cycle of the IMM process), which are referred to as mixed initial conditions.

Figure 4:
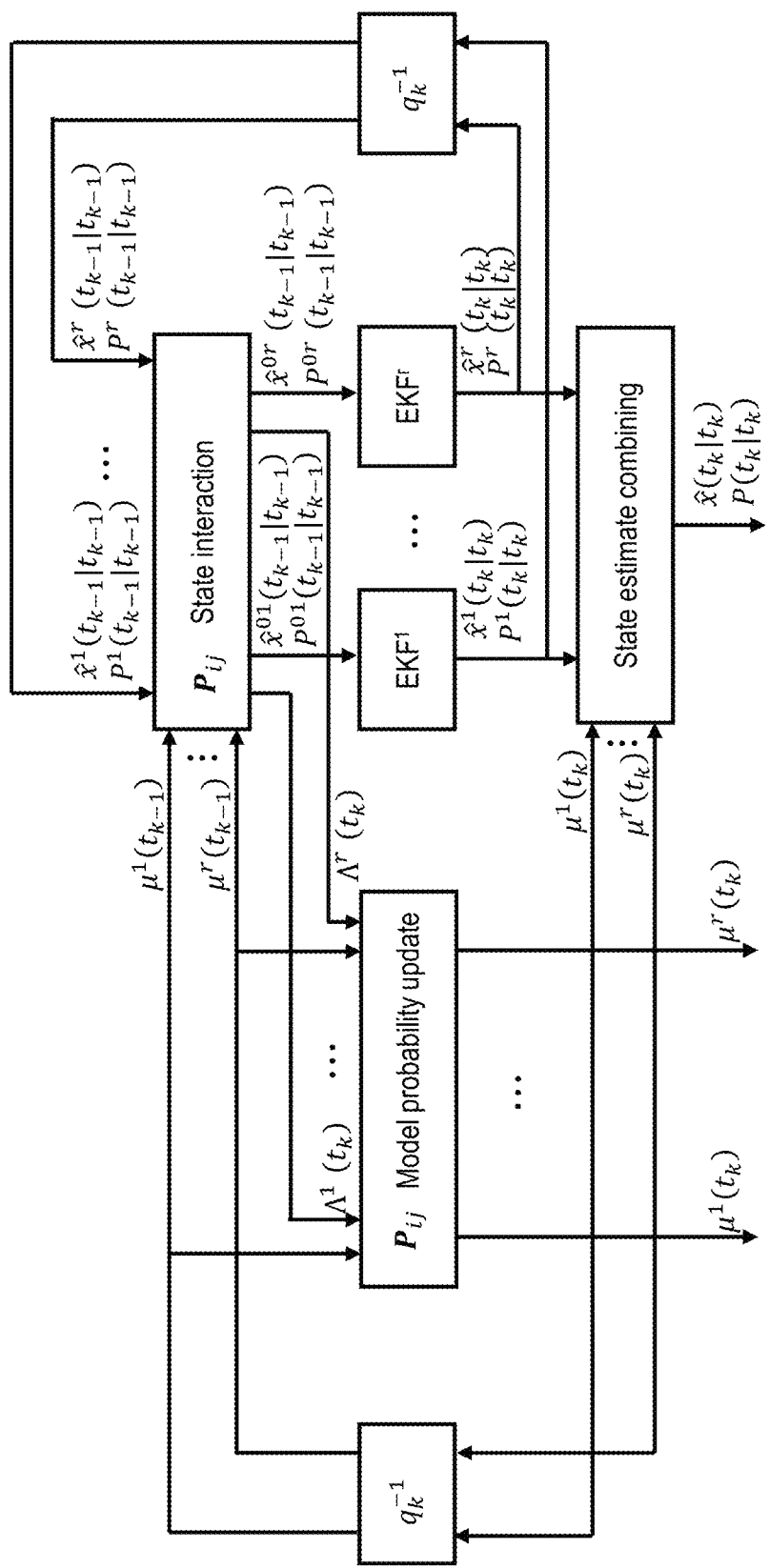
FIG. 4 is a schematic diagram of a cycle of an exemplary interacting-multiple-model filter process according to embodiments of the disclosure.

FIG. 4 is a schematic diagram of one cycle of an exemplary IMM process according to an embodiment of the present disclosure. The IMM process may be used, for example, to determine the two-dimensional position of the moving wireless device as part of the method 300 described above in respect of FIG. 3, for example (e.g. as part of step 304). Thus, the IMM process may be used to determine the position of the wireless device 202 described above in respect of FIG. 2, for example.

The IMM process comprises r interacting filters operating in parallel for r≥2. The state interaction/mixing unit determines mixed initial conditions, $\hat{x}^{01} \ldots \hat{x}^{0r}$, for each of the r filters from initial state estimates $\hat{x}^1 \ldots \hat{x}^r$ (e.g. initial position estimates) for the moving wireless device 102. Mixing is performed at the input of the filters with the probabilities, and may be conditioned on earlier measurement data, $z(t_{k-1})$. The mixed initial conditions are, together with measurement data for a first time instance, $z(t_k)$, input to the r filters.

The measurement data for the first time instance, $z(t_k)$ (or equivalently, $z^k$), comprises CFO measurements performed on signals transmitted between the wireless device 102 and three or more base stations. The three or more base stations may be the base stations 204 described above in respect of FIG. 2, for example. The CFO measurements may be obtained, for example, as described above in respect of step 302 in the method 300 shown in FIG. 3.

One cycle of the IMM process may comprise the following steps:

1. State Interaction and State Mixing

The state and covariance matrices of a previous cycle (e.g. iteration) of the IMM process may be mixed to provide initial conditions to the mode matched filtering. This mixing is based on the mode transition probability matrix, $P_{ij}$, and the mode probabilities of a previous iteration (e.g. cycle) of the IMM process, $\mu_i(t_{k-1})$. The probability (e.g. the mixing probability) that mode $M_i$ was in effect at time $t_{k-1}$, given that mode $M_j$ is in effect at time $t_k$, given state estimation data $z(t_{k-1})$ is $$\mu_{i|j}(t_{k-1} \mid t_{k-1}) = \frac{1}{\bar{c}^j} p_{ij} \mu_i(t_{k-1}).$$

The normalising constants, $\bar{c}_j$, are given by the below equation, which uses mode transition probabilities $p_{ij}$. The mode transition probability, $p_{ij}$, is the probability that the wireless device 202 is in a mode j at time k, given that the wireless device 202 was in a mode i at a time $t_{k-1}$ (e.g. the probability of transition from mode i to mode j). The expression for the normalising constant is:

$$\bar{c}^j = \sum_{i=1}^{r} p_{ij} \mu_i(t_{k-1})$$

The mixed initial condition for the filter matched to mode $M_j(t_k)$ may be written as $$\hat{x}^{0j}(t_{k-1} \mid t_{k-1}) = \sum_{i=1}^{r} \mu_{i|j}(t_{k-1} \mid t_{k-1}) \hat{x}^i(t_{k-1} \mid t_{k-1}),$$

for j=1, ... r. $\hat{x}^i(t_{k-1} \mid t_{k-1})$ is the state estimate at time $t_{k-1}$ for mode i. The corresponding covariance is:

$$P^{0j}(t_{k-1} \mid t_{k-1}) = \sum_{i=1}^{r} \mu_{i|j}(t_{k-1} \mid t_{k-1})\left(P^i(t_{k-1} \mid t_{k-1}) + \left(\hat{x}^i(t_{k-1} \mid t_{k-1}) - \hat{x}^{0j}(t_{k-1} \mid t_{k-1})\right)\left(\hat{x}^i(t_{k-1} \mid t_{k-1}) - \hat{x}^{0j}(t_{k-1} \mid t_{k-1})\right)^T\right),$$

in which $P^i(t_{k-1}|t_{k-1})$ is the state covariance matrix at time $t_{k-1}$ for mode i. The latter term appears when summing covariance matrices of a Gaussian mixture.

2. Mode Matched Filtering

For each mode, the respective initial conditions obtained in step 2 are used as input to a filter matched to the mode. An exemplary implementation of a filter, an extended Kalman filter, is described in more detail below.

3. Mode Probability Update

The probability of a particular mode at time $t_k$, $\mu^j(t_k)$, depends on a likelihood of the latest measurement $z(t_k)$ given the mode and the initial state and covariance matrices. The likelihood function, $\Lambda^j$, of a mode j (corresponding to a respective filter in the r filters) is:

$$\Lambda^j(t_k) = p[z(k)|M_j(t_k), z(t_{k-1})].$$

The respective likelihood function for each mode may thus be computed using the mixed initial condition and the associated covariance:

$$\Lambda^j(t_k) = p(z(t_k)|M_j, \hat{x}^{0j}(t_{k-1}|t_{k-1}), P^{0k}(t_{k-1}|t_{k-1})).$$

The probability of a mode j may be determined using:

$$\mu^j(t_k) = \frac{1}{c}\Lambda^j(t_k)\bar{c}^j,$$

in which $\bar{c}^j$ is given above and the normalisation factor c is:

$$c = \sum_{j=1}^{r} \Lambda_j(t_k)\bar{c}^j.$$

4. State Estimate Combining

The mode probabilities may be used to combine the state estimates and covariance matrices for each of the modes to obtain a combined state estimate, $\hat{x}(t_k|t_k)$, and covariance matrix, $P(t_k|t_k)$:

$$\hat{x}(t_k \mid t_k) = \sum_{j=1}^{r} \mu^j(t_k)\hat{x}^j(t_k \mid t_k), \text{ and}$$

$$P(t_k \mid t_k) = \sum_{j=1}^{r} \mu^j(t_k)\left(P^j(t_k \mid t_k) + \left(\hat{x}^j(t_k \mid t_k) - \hat{x}(t_k \mid t_k)\right)\left(\hat{x}^j(t_k \mid t_k) - \hat{x}(t_k \mid t_k)\right)^T\right).$$

As described above, using IMM filtering to determine the kinematic state of a wireless device assumes that the wireless device moves according to one of a finite number of modes.

Embodiments of the present disclosure provide a two-mode model for a moving wireless device. As described above, a CFO is only measurable when a wireless device is moving, which means that CFO measurements may only be used to infer the position of a moving wireless device. The wireless device may thus be modelled as being in one of two movement modes comprising a first state model driven by a first acceleration noise and a second state model driven by a second acceleration noise. Each of the first and second state models may be four-dimensional models, in which two dimensions are used for position components and two dimensions are used for velocity components. Thus, the wireless device is assumed to be moving in a plane (e.g. to have negligible movement in a third dimension). In both modes the wireless device may be assumed to be moving (e.g. non-stationary).

Both modes are based upon constant velocity modes that are subject to an acceleration noise (represented by a Wiener process), and the second mode uses a larger acceleration noise than the first mode. The first mode may thus be an almost constant velocity model, whereas the second mode may be a manoeuvre mode with a larger acceleration. In each mode, the acceleration noise may be represented by a Wiener process.

Both models may comprise an extra bias state component (e.g. the models may be fifth-dimensional) to account for a CFO bias, which may be modelled as a random walk. As described above, the CFO bias captures other factors that contribute to a measured CFO such as, for example, an offset in the frequency of sampling clocks at the wireless device and a respective base station.

The first state model (e.g. the first movement mode) is given by $$dx^1(t) = \begin{pmatrix} 0 & 0 & 1 & 0 & 0 \\ 0 & 0 & 0 & 1 & 0 \\ 0 & 0 & 0 & 0 & 0 \\ 0 & 0 & 0 & 0 & 0 \\ 0 & 0 & 0 & 0 & 0 \end{pmatrix} x^1(t) dt + \begin{pmatrix} 0 & 0 & 0 \\ 0 & 0 & 0 \\ 1 & 0 & 0 \\ 0 & 1 & 0 \\ 0 & 0 & 1 \end{pmatrix} w^1(t) dt$$

$$E[(w^1(t)dt)(w^1(s)ds)] = \begin{pmatrix} q_{11}^1 & 0 & 0 \\ 0 & q_{22}^1 & 0 \\ 0 & 0 & q_{bias} \end{pmatrix} \delta(t-s) dt,$$

in which $x^1$ denotes the state vector, $w^1$ denotes the acceleration noise (e.g. a Wiener process system noise), $q_{11}$ is the variance of the acceleration noise in a first dimension, $q_{22}$ is the variance of the acceleration noise in a second dimension, $q_{bias}$ is the variance of the CFO bias (e.g. the drift rate of the CFO bias) and $\delta(t-s)$ is the Dirac delta function.

The second state model (e.g. the second movement mode) is given by:

$$dx^2(t) = \begin{pmatrix} 0 & 0 & 1 & 0 & 0 \\ 0 & 0 & 0 & 1 & 0 \\ 0 & 0 & 0 & 0 & 0 \\ 0 & 0 & 0 & 0 & 0 \\ 0 & 0 & 0 & 0 & 0 \end{pmatrix} x^2(t) dt + \begin{pmatrix} 0 & 0 & 0 \\ 0 & 0 & 0 \\ 1 & 0 & 0 \\ 0 & 1 & 0 \\ 0 & 0 & 1 \end{pmatrix} w^2(t) dt$$

$$E[(w^2(t)dt)(w^2(s)ds)] = \begin{pmatrix} q_{11}^2 & 0 & 0 \\ 0 & q_{22}^2 & 0 \\ 0 & 0 & q_{bias} \end{pmatrix} \delta(t-s) dt,$$

in which $x^2$ denotes the state vector and $w^2$ denotes the acceleration noise (e.g. a Wiener process). As noted above, the second mode may have a larger acceleration noise than the first movement mode. Thus, in particular embodiments, $E|w^2| > E|w^1|$, where E denotes mathematical expectation.

Any suitable filters may be used for the r filters in the IMM process, including, for example, one or more particle filters. In particular examples, a nonlinear extended Kalman Filter (EKF) may be used for each filter $M_j$ in the r filters in the IMM process. An extended Kalman Filter uses linear approximations of a nonlinear system. It can be used to estimate the kinematic state of a discrete-time dynamic system described by a vector difference equation with additive white Gaussian noise that models unpredictable disturbances.

In an extended Kalman filter, a mode is modelled as a linear state space differential equation and a non-linear measurement equation. The kinematic state of the moving wireless device in a mode i at a time $t_{k+1}$ is given by $$x^i(t_{k+1}) = A^i(t_{k+1}, t_k) x^i(t_k) + w^i(t_k),$$

in which $A^i$ is a discrete time systems matrix and $w^i$ is the system measurement noise. Thus, for example, for the first movement mode described above with a time varying sampling interval, $T_k = t_k - t_{k-1}$, the discrete time systems matrix is given by $$A^1(t_k, t_{k-1}) = \begin{pmatrix} 1 & 0 & T_k & 0 & 0 \\ 0 & 1 & 0 & T_k & 0 \\ 0 & 0 & 1 & 0 & 0 \\ 0 & 0 & 0 & 1 & 0 \\ 0 & 0 & 0 & 0 & 1 \end{pmatrix}.$$

Similarly, for the second movement mode:

$$A^2(t_k, t_{k-1}) = \begin{pmatrix} 1 & 0 & T_k & 0 & 0 \\ 0 & 1 & 0 & T_k & 0 \\ 0 & 0 & 1 & 0 & 0 \\ 0 & 0 & 0 & 1 & 0 \\ 0 & 0 & 0 & 0 & 1 \end{pmatrix}.$$

CFO measurements for the UAV 102 at a time $t_k$ are assumed to depend on the kinematic state of the UAV 102 according to:

$$\hat{z}^i(t_k) = h(\hat{x}^i(t_k)) + e(t_k),$$

in which h is the measurement equation, which is a nonlinear function of the kinematic state, and e is the measurement noise. The covariance matrix for the system noise is $$Q^i(t_{k+1}, t_k) = E[w^i(t_k)(w^i(t_k))^T]$$

for i=1, . . . , r. Thus, for the first movement mode described above, the covariance matrix for the system noise may be written as $$Q^1(t_k, t_{k-1}) = \begin{pmatrix} 1/3 q_{11}^1 T_k^3 & 0 & 1/2 q_{11}^1 T_k^2 & 0 & 0 \\ 0 & 1/3 q_{22}^1 T_k^3 & 0 & 1/2 q_{22}^1 T_k^2 & 0 \\ 1/2 q_{11}^1 T_k^2 & 0 & q_{11}^1 T_k & 0 & 0 \\ 0 & 1/2 q_{22}^1 T_k^2 & 0 & q_{22}^1 T_k & 0 \\ 0 & 0 & 0 & 0 & q_{bias} T_k \end{pmatrix}$$

Similarly, the covariance matrix for the system noise for the second movement mode described above may be written as:

$$Q^2(t_k, t_{k-1}) = \begin{pmatrix} 1/3 q_{11}^2 T_k^3 & 0 & 1/2 q_{11}^2 T_k^2 & 0 & 0 \\ 0 & 1/3 q_{22}^2 T_k^3 & 0 & 1/2 q_{22}^2 T_k^2 & 0 \\ 1/2 q_{11}^2 T_k^2 & 0 & q_{11}^2 T_k & 0 & 0 \\ 0 & 1/2 q_{22}^2 T_k^2 & 0 & q_{22}^2 T_k & 0 \\ 0 & 0 & 0 & 0 & q_{bias} T_k \end{pmatrix}$$

The covariance matrix for the measurement noise is $$R^i(t_{k+1}, t_k) = E[e(t_k)(e(t_k))^T]$$

for i=1, . . . , r.

As described above, the measurement equation, which relates CFO measurements to the kinematic state of a moving wireless device, may be given by $$\hat{z}^i(\hat{x}^i) = h(\hat{x}^i) = -\frac{f_c}{c} \frac{((\hat{x}_1^i - x_{s,1})\hat{x}_3^i + (\hat{x}_2^i - x_{s,2})\hat{x}_4^i)}{\sqrt{(\hat{x}_1^i - x_{s,1})^2 + (\hat{x}_2^i - x_{s,2})^2 + (0 - x_{s,3})^2}} + \hat{x}_5^i,$$

in which $\hat{z}^i$ is a predicted CFO assuming the moving wireless device is in a kinematic state $\hat{x}^i$. The measurement equation may be evaluated using a predicted kinematic state of the moving wireless device 202 (e.g. a predicted two-dimensional position $\hat{x}_1^i, \hat{x}_2^i$ and a predicted two-dimensional velocity $\hat{x}_3^i, \hat{x}_4^i$ if the wireless device is assumed to be moving in a mode i). A predicted CFO bias may also be included (e.g. if this quantity is not determined by other means). The matrices A, Q, R are assumed to be known and may be time varying. In other words, the system may be time varying and/or the noise may be nonstationary.

The initial kinematic state x(0) of the wireless device 202 may be unknown and may be modelled as a random variable that is Gaussian-distributed with a known mean and covariance. The two noise sequences, e(k) and w(k), and the initial state may be assumed to be mutually independent. This constitutes the Linear-Gaussian (LG) assumption.

This results in the following extended Kalman filter iteration, which, in an IMM process, may be performed for each of the modes i=1, . . . , r. For each mode, an initial prediction of the kinematic state of the moving wireless device 202 may be determined based on an estimate of the kinematic state of the wireless device 202 at an earlier time:

$$\hat{x}^i(t_k \mid t_{k-1}) = A^i(t_k, t_{k-1})\hat{x}^i(t_{k-1} \mid t_{k-1})$$

$$P^i(t_k \mid t_{k-1}) = A^i(t_k, t_{k-1})P^i(t_{k-1} \mid t_{k-1})\left(A^i(t_k, t_{k-1})\right)^T + Q^i(t_k, t_{k-1}),$$

in which $A^i$ is a discrete time systems matrix and $Q^j$ is a systems noise covariance matrix. For example, in embodiments in which the two-mode model described above is used, $A^1$ and $A^2$ given above may be used as the discrete time systems matrix for the first and second movement modes respectively. A predicted CFO may be determined using the measurement equation:

$$\hat{z}^i(t_k \mid t_{k-1}) = h\big(\hat{x}^i(t_k \mid t_{k-1})\big).$$

$$H^i\big(\hat{x}^i(t_k \mid t_{k-1})\big) = \left.\frac{\partial h(\hat{x})}{\partial \hat{x}}\right|_{x=\hat{x}^i(t_k \mid t_{k-1})}$$

The partial derivatives may be written as:

$$\left.\frac{\partial h(\hat{x})}{\partial \hat{x}}\right|_{\hat{x}=\hat{x}^i} = \left(\frac{\partial h(\hat{x})}{\partial \hat{x}_1}\; \frac{\partial h(\hat{x})}{\partial \hat{x}_2}\; \frac{\partial h(\hat{x})}{\partial \hat{x}_3}\; \frac{\partial h(\hat{x})}{\partial \hat{x}_4}\; \frac{\partial h(\hat{x})}{\partial \hat{x}_5}\right)_{\hat{x}=\hat{x}^i},$$

where $$\left.\frac{\partial h(\hat{x})}{\partial \hat{x}_1}\right|_{\hat{x}=\hat{x}^i} = -\frac{f_c}{c}\frac{\hat{x}_3^i}{\sqrt{(\hat{x}_1^i - x_{s,1})^2 + (\hat{x}_2^i - x_{s,2})^2 + (0 - x_{s,3})^2}} +$$

$$\frac{f_c}{c}\frac{(\hat{x}_1^i - x_{s,1})\big((\hat{x}_1^i - x_{s,1})\hat{x}_3^i + (\hat{x}_2^i - x_{s,2})\hat{x}_4^i\big)}{\big((\hat{x}_1^i - x_{s,1})^2 + (\hat{x}_2^i - x_{s,2})^2 + (0 - x_{s,3})^2\big)^{\frac{3}{2}}},$$

$$\left.\frac{\partial h(\hat{x})}{\partial \hat{x}_2}\right|_{\hat{x}=\hat{x}^i} = -\frac{f_c}{c}\frac{\hat{x}_4^i}{\sqrt{(\hat{x}_1^i - x_{s,1})^2 + (\hat{x}_2^i - x_{s,2})^2 + (0 - x_{s,3})^2}} +$$

$$\frac{f_c}{c}\frac{(\hat{x}_2^i - x_{s,2})\big((\hat{x}_1^i - x_{s,1})\hat{x}_3^i + (\hat{x}_2^i - x_{s,2})\hat{x}_4^i +\big)}{\big((\hat{x}_1^i - x_{s,1})^2 + (\hat{x}_2^i - x_{s,2})^2 + (0 - x_{s,3})^2\big)^{\frac{3}{2}}},$$

$$\left.\frac{\partial h(\hat{x})}{\partial \hat{x}_4}\right|_{\hat{x}=\hat{x}^i} = -\frac{f_c}{c}\frac{(\hat{x}_1^i - x_{s,1})}{\sqrt{(\hat{x}_1^i - x_{s,1})^2 + (\hat{x}_2^i - x_{s,2})^2 + (0 - x_{s,3})^2}},$$

$$\left.\frac{\partial h(\hat{x})}{\partial \hat{x}_3}\right|_{\hat{x}=\hat{x}^i} = -\frac{f_c}{c}\frac{(\hat{x}_2^i - x_{s,2})}{\sqrt{(\hat{x}_1^i - x_{s,1})^2 + (\hat{x}_2^i - x_{s,2})^2 + (0 - x_{s,3})^2}},$$

$$\left.\frac{\partial h(\hat{x})}{\partial \hat{x}_5}\right|_{\hat{x}=\hat{x}^i} = 1.$$

The predicted CFO, $\hat{z}^i$, may be compared to the measured CFO, $z(t_k)$, (e.g. CFO measurements for signals sent between the moving wireless device 202 and the three or more base stations 204) to determine a measurement residual:

$$\Sigma^i(t_k) = z(t_k) - \hat{z}^i(t_k \mid t_{k-1})$$

The partial derivatives of the measurement equation may be used to calculate the measurement covariance, $S^i$:

$$S^i(t_k) = H^i\big(\hat{x}^i(t_k \mid t_{k-1})\big)P^i(t_k \mid t_{k-1})\big(H^i\big(\hat{x}^i(t_k \mid t_{k-1})\big)\big)^T + R^i(t_k, t_{k-1}),$$

in which $R^i$ is the measurement noise covariance matrix given above. In particular examples, measurement updates may be scalar and irregular, which means that the measurement covariance matrix may be scalar. The Kalman gain matrix, $K^i$, may be expressed as:

$$K^i(t_k) = P^i(t_k \mid t_{k-1})\big(H^i\big(\hat{x}^i(t_k \mid t_{k-1})\big)\big)^T\big(S^i(t_k)\big)^{-1}.$$

The predicted state at a time $t_k$ and the associated covariance, $P^i$, may be given by:

$$\hat{x}^i(t_k \mid t_k) = \hat{x}^i(t_k \mid t_{k-1}) + K^i\varepsilon^i(t_k),$$

$$P^i(t_k \mid t_k) = P^i(t_k \mid t_{k-1}) - K^i(t_k)S^i(t_k)\big(K^i(t_k)\big)^T.$$

One iteration of an extended Kalman Filter may thus be used to determine a kinematic state of the wireless device based on CFO measurements for three or more base stations.

As described above, a plurality of extended Kalman Filters may be used as part of an IMM filter to determine a two-dimensional kinematic state (e.g. a position) of a wireless device 202 based on CFO measurements. In this case, the CFO measurements are input into each of the plurality of extended Kalman Filters in the IMM filter, and the outputs of the plurality of extended Kalman Filters are combined to determine the kinematic state of the wireless device 202. Thus, each extended Kalman Filter may output a respective kinematic state estimate and associated covariance matrix, which are combined in the IMM filter to determine the position of the wireless device 202. Each of the extended Kalman filters may be, for example, associated with a movement mode in a model comprising a plurality of movement modes. For example, an IMM filter may comprise two extended Kalman filters, in which a first extended Kalman filter corresponds to the first movement mode described above and a second extended Kalman filter corresponds to the second movement mode described above.

In alternative examples, only a single extended Kalman Filter may be used. In this case, the two-dimensional kinematic state (e.g. position) of the wireless device 202 may be determined by inputting the CFO measurements into the single extended Kalman Filter and obtaining a kinematic state estimate for the wireless device 202 from the extended Kalman Filter.

One or more extended Kalman Filters may thus be used to determine a kinematic state (e.g. a two-dimensional position, $x(t_k)$) of the moving wireless device 202 based on CFO measurements, $z(t_k)$, of signals sent between the moving wireless device 202 and three or more base stations.

In particular embodiments, CFO measurements for each of the three or more base stations 204 may be performed and/or obtained at different times. Conventionally, IMM filters may use a fixed mode transition matrix $P_{ij}$, which does not take into account differences between measurement times. This may result in high rates of mode mixing in the IMM filter, which may be unphysical. In particular, this may lead to a movement mode which is adapted to steady straight line movement (e.g. the first movement mode described above with a lower acceleration noise than the second movement mode) being underutilised.

To account for differences between measurement times, the present disclosure provides an adapted IMM filtering process which comprises sampling a continuous-time mode transition model that is parametrised in terms of a time between CFO measurements. The continuous-time transition model may be re-sampled (e.g. re-discretised) each time a new CFO measurement is obtained.

For a wireless device operating in one of n modes, a net increase in the probability of the wireless device being in a first mode may equal a probability that has diffused to the first mode from the other n−1 modes minus the diffusion from the first mode to the other n−1 modes. Thus the diffused probability from a mode i may be the product of a mode diffusion rate parameter, $\lambda_{ij}$, a time increment $\Delta$ and a mode probability of the originating (e.g. initial) mode, $\mu_i(t)$. The probability of each of the modes may thus be given by:

$$\begin{pmatrix} \mu_1(t+\Delta) \\ \vdots \\ \mu_n(t+\Delta) \end{pmatrix} = \begin{pmatrix} \mu_1(t) \\ \vdots \\ \mu_n(t) \end{pmatrix} + \begin{pmatrix} \lambda_{11} & \cdots & \lambda_{1n} \\ \vdots & \ddots & \vdots \\ \lambda_{n1} & \cdots & \lambda_{nn} \end{pmatrix} \Delta \begin{pmatrix} \mu_1(t) \\ \vdots \\ \mu_n(t) \end{pmatrix},$$

which may be rewritten as $$\frac{1}{\Delta}\left(\begin{pmatrix} \mu_1(t+\Delta) \\ \vdots \\ \mu_n(t+\Delta) \end{pmatrix} - \begin{pmatrix} \mu_1(t) \\ \vdots \\ \mu_n(t) \end{pmatrix}\right) = \begin{pmatrix} \lambda_{11} & \cdots & \lambda_{1n} \\ \vdots & \ddots & \vdots \\ \lambda_{n1} & \cdots & \lambda_{nn} \end{pmatrix} \begin{pmatrix} \mu_1(t) \\ \vdots \\ \mu_n(t) \end{pmatrix}.$$

This may be written as an ordinary differential equation:

$$\begin{pmatrix} \dot\mu_1(t) \\ \vdots \\ \dot\mu_n(t) \end{pmatrix} = \begin{pmatrix} \lambda_{11} & \cdots & \lambda_{1n} \\ \vdots & \ddots & \vdots \\ \lambda_{n1} & \cdots & \lambda_{nn} \end{pmatrix} \begin{pmatrix} \mu_1(t) \\ \vdots \\ \mu_n(t) \end{pmatrix},$$

with solution $$\begin{pmatrix} \mu_1(\tau) \\ \vdots \\ \mu_n(\tau) \end{pmatrix} = \exp\left(\begin{pmatrix} \lambda_{11} & \cdots & \lambda_{1n} \\ \vdots & \ddots & \vdots \\ \lambda_{n1} & \cdots & \lambda_{nn} \end{pmatrix} \tau\right) \begin{pmatrix} \mu_1(0) \\ \vdots \\ \mu_n(0) \end{pmatrix},$$

which may be evaluated at time T.

For a two-mode model, such as that described above, the diffusion rate from the first mode to the second mode may be equal to the inverse of the diffusion rate from the second mode to the first mode. Under this assumption, a component-wise solution to the continuous-time mode transition probability matrix was computed using the MAPLE software package, giving:

$$D_1 = \lambda_{11} + \lambda_{22}$$

$$D_2 = \sqrt{\lambda_{11}^2 + \lambda_{22}^2 - 2\lambda_{11}\lambda_{22} + 4\lambda_{12}^2}$$

-continued $$\left(\exp\begin{pmatrix} \lambda_{11}\tau & \lambda_{12}\tau \\ \lambda_{12}\tau & \lambda_{22}\tau \end{pmatrix}\right)_{11} =$$

$$\frac{1}{2D_2}\left(D_2\left(e^{\frac{1}{2}(D_1+D_2)\tau} + e^{\frac{1}{2}(D_1-D_2)\tau}\right) + (\lambda_{11}-\lambda_{22})\left(e^{\frac{1}{2}(D_1+D_2)\tau} - e^{\frac{1}{2}(D_1-D_2)\tau}\right)\right)$$

$$\left(\exp\begin{pmatrix} \lambda_{11}\tau & \lambda_{12}\tau \\ \lambda_{12}\tau & \lambda_{22}\tau \end{pmatrix}\right)_{12} =$$

$$\left(\exp\begin{pmatrix} \lambda_{11}\tau & \lambda_{12}\tau \\ \lambda_{12}\tau & \lambda_{22}\tau \end{pmatrix}\right)_{21} = \frac{\lambda_{12}}{D_2}\left(e^{\frac{1}{2}(D_1+D_2)\tau} + e^{\frac{1}{2}(D_1-D_2)\tau}\right)$$

$$\left(\exp\begin{pmatrix} \lambda_{11}\tau & \lambda_{12}\tau \\ \lambda_{12}\tau & \lambda_{22}\tau \end{pmatrix}\right)_{22} =$$

$$\frac{1}{2D_2}\left(D_2\left(e^{\frac{1}{2}(D_1+D_2)\tau} + e^{\frac{1}{2}(D_1-D_2)\tau}\right) + (\lambda_{22}-\lambda_{11})\left(e^{\frac{1}{2}(D_1+D_2)\tau} - e^{\frac{1}{2}(D_1-D_2)\tau}\right)\right).$$

For a stationary non-zero solution, the derivative is zero and the probabilities sum to one, which means that $$\lambda_{11} = -\lambda_{12}$$

$$\lambda_{22} = -\lambda_{21}$$

This gives $$\exp\begin{pmatrix} \lambda_{11}\tau & -\lambda_{11}\tau \\ -\lambda_{22}\tau & \lambda_{22}\tau \end{pmatrix} = \begin{pmatrix} \frac{\lambda_{22} + \lambda_{11}e^{(\lambda_{11}+\lambda_{22})\tau}}{\lambda_{11}+\lambda_{22}} & -\frac{\lambda_{11}\left(e^{(\lambda_{11}+\lambda_{22})\tau} - 1\right)}{\lambda_{11}+\lambda_{22}} \\ -\frac{\lambda_{22}\left(e^{(\lambda_{11}+\lambda_{22})\tau} - 1\right)}{\lambda_{11}+\lambda_{22}} & \frac{\lambda_{11} + \lambda_{22}e^{(\lambda_{11}+\lambda_{22})\tau}}{\lambda_{11}+\lambda_{22}} \end{pmatrix}.$$

Therefore, in the simplified case with the additional condition described above (e.g. for a stationary non-zero solution, referred to as the first constraint):

$$\exp\begin{pmatrix} \lambda_{11}\tau & -\lambda_{11}\tau \\ -\lambda_{22}\tau & \lambda_{22}\tau \end{pmatrix} = \begin{pmatrix} \frac{\lambda_{22} + \lambda_{11}e^{(\lambda_{11}+\lambda_{22})\tau}}{\lambda_{11}+\lambda_{22}} & -\frac{\lambda_{11}\left(e^{(\lambda_{11}+\lambda_{22})\tau} - 1\right)}{\lambda_{11}+\lambda_{22}} \\ -\frac{\lambda_{22}\left(e^{(\lambda_{11}+\lambda_{22})\tau} - 1\right)}{\lambda_{11}+\lambda_{22}} & \frac{\lambda_{11} + \lambda_{22}e^{(\lambda_{11}+\lambda_{22})\tau}}{\lambda_{11}+\lambda_{22}} \end{pmatrix}.$$

In addition, the diagonal elements of the discretized mode transition matrix used above are the same. This means that $$\lambda_{11} = \lambda_{22},$$

which is referred to as the second constraint. This further simplifies the aforementioned expression to give:

$$\exp\begin{pmatrix} \lambda_{11}\tau & -\lambda_{11}\tau \\ -\lambda_{11}\tau & \lambda_{11}\tau \end{pmatrix} = \begin{pmatrix} \frac{1}{2} + \frac{1}{2}e^{2\lambda_{11}\tau} & \frac{1}{2} - \frac{1}{2}e^{2\lambda_{11}\tau} \\ \frac{1}{2} - \frac{1}{2}e^{2\lambda_{11}\tau} & \frac{1}{2} + \frac{1}{2}e^{2\lambda_{11}\tau} \end{pmatrix},$$

which may be evaluated at time T.

Replacing $\tau$ with $T_k = t_k - t_{k-1}$, as in the dynamic state models above, it follows that, in the IMM formalism:

$$\mu_{i|j} = \exp\left(\begin{pmatrix} \lambda_{11} & \lambda_{12} \\ \lambda_{21} & \lambda_{22} \end{pmatrix} T_k\right),$$

Applying the first constraint described above (e.g. for a stationary non-zero solution) gives:

$$\mu_{i|j} = \exp\begin{pmatrix} \lambda_{11}T_k & -\lambda_{11}T_k \\ -\lambda_{22}T_k & \lambda_{22}T_k \end{pmatrix} = \begin{pmatrix} \frac{\lambda_{22} + \lambda_{11}e^{(\lambda_{11}+\lambda_{22})T_k}}{\lambda_{11}+\lambda_{22}} & -\frac{\lambda_{11}(e^{(\lambda_{11}+\lambda_{22})T_k}-1)}{\lambda_{11}+\lambda_{22}} \\ -\frac{\lambda_{22}(e^{(\lambda_{11}+\lambda_{22})T_k}-1)}{\lambda_{11}+\lambda_{22}} & \frac{\lambda_{11}+\lambda_{22}e^{(\lambda_{11}+\lambda_{22})T_k}}{\lambda_{11}+\lambda_{22}} \end{pmatrix}.$$

Applying the second constraint described above further reduces the discrete time transition probability matrix to:

$$\mu_{i|j} = \exp\begin{pmatrix} \lambda_{11}T_k & -\lambda_{11}T_k \\ -\lambda_{11}T_k & \lambda_{11}T_k \end{pmatrix} = \begin{pmatrix} \frac{1}{2}+\frac{1}{2}e^{2\lambda_{11}T_k} & \frac{1}{2}-\frac{1}{2}e^{2\lambda_{11}T_k} \\ \frac{1}{2}-\frac{1}{2}e^{2\lambda_{11}T_k} & \frac{1}{2}+\frac{1}{2}e^{2\lambda_{11}T_k} \end{pmatrix}.$$

Thus, given a sampling period $T_k$, a time varying discrete time transition probability matrix can be computed, which makes mode mixing invariant with respect to the measurement time instances. By sampling this continuous-time mode transition model, embodiments described herein enable CFO measurements for three or more base stations that were performed at different times to be used to determine a two-dimensional kinematic state (e.g. position) of a moving wireless device.

The present disclosure thus provides methods by which a two-dimensional position of a moving wireless device may be determined using CFO measurements for three or more base stations. The CFO measurements may be, for example, input to one or more extended Kalman filters to determine the wireless device's position. In particular embodiments, the movement of the wireless device is modelled using two movement modes in which the wireless device has a non-zero (two-dimensional) velocity. One of the movement modes has a higher acceleration noise than the other, and thus may be referred to as a manoeuvre mode. A continuous-time mode transition model may be sampled as part of the IMM process to enable CFO measurements performed at different times to be used when determining the wireless devices position.

The skilled person will appreciate that, conventionally, CFO measurements alone are not considered to be sufficient to determine position. For example, a single CFO measurement is usually considered insufficient to deduce one dimensional position information. In order to illustrate that CFO measurements can be used to determine a position of a moving wireless device, an observability study was performed, with the results illustrated in FIGS. 5a and 5b.

A linear system of order n (e.g. with n state variables), characterised by $$\dot{x}=Ax$$

$$y=Hx,$$

in which x is a property of the system that is not being directly measured (e.g. a position of the UAV) and y is a measurable quantity (e.g. CFO, z), is observable provided the row rank of the observability matrix is equal to n. The observability matrix, O, of such a linear system may be given by $$O = \begin{pmatrix} H \\ HA \\ \vdots \\ HA^{n-1} \end{pmatrix}.$$

Thus, a linear system is observable if $$\operatorname{rank}(O) = \operatorname{rank}\begin{pmatrix} H \\ HA \\ \vdots \\ HA^{n-1} \end{pmatrix} = n.$$

That is, if the observability matrix has n linearly independent rows, then the property x may be determined using the measurable quantity y (e.g. the system is observable). The observability of a system may also be determined by considering the minimum singular values of the observability matrix. The rank of a matrix equals the number of non-zero singular values of the matrix. As an n×n matrix has n singular values, if the minimum singular value of a square matrix is equal to zero, then rank(O)<n, and the system may not be observable. In general, the higher and more equally distributed the singular values of the observability matrix are, the better conditioned the associated estimation problem.

The observability of the methods of the present disclosure was evaluated by using this linear state equation, together with the linearised measurement equations for one of the two modes provided above. Two scenarios were considered: a first scenario with two base stations and a second scenario with three base stations. The following base station positions were used:

$$S_1 = (200\ 100\ 5)^T m,$$

$$S_2 = (100\ 40\ 110)^T m,$$

$$S_3 = (800\ -50\ 70)^T m.$$

The wireless device was assumed to move at a constant velocity of $$\begin{pmatrix} x_3 \\ x_4 \end{pmatrix} = \begin{pmatrix} 5 \\ 10 \end{pmatrix} ms^{-1}.$$

Figure 5A:
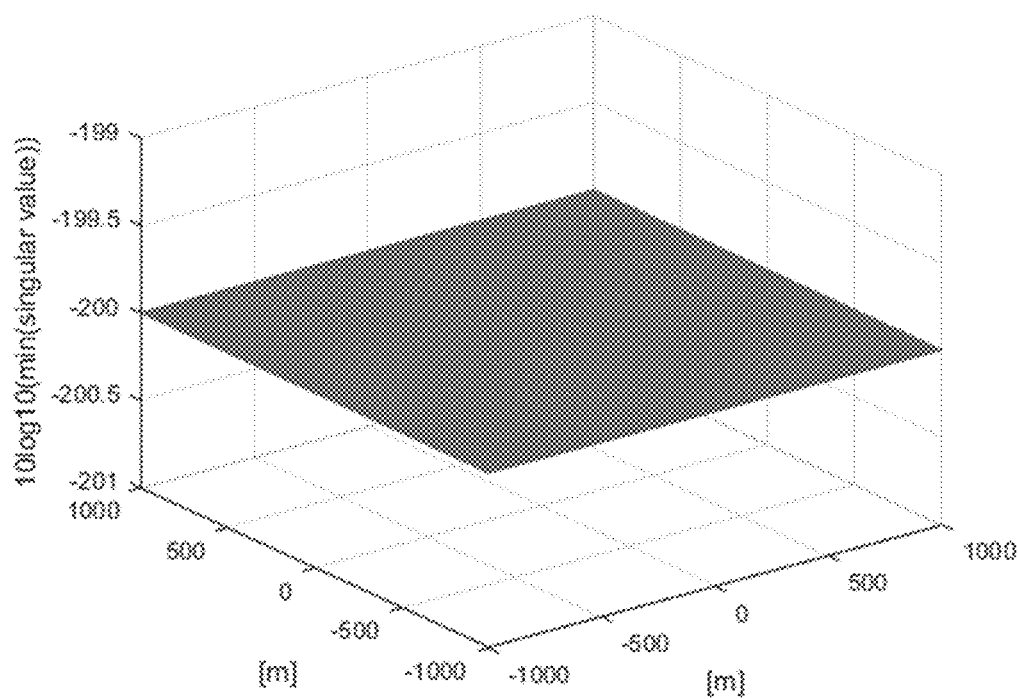
FIGS. 5a and 5b show maps of minimum singular values of an observability matrix for a method of determining a position of a moving wireless device using measurements for two and three base stations respectively.
Figure 5B:
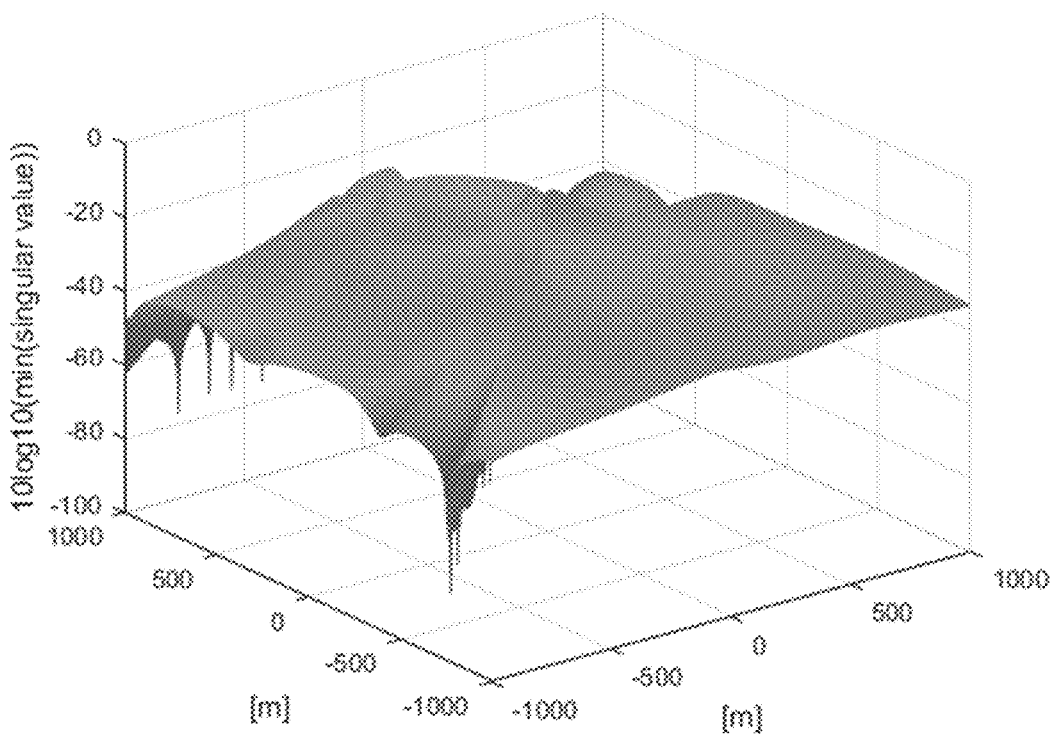

FIGS. 5a and 5b indicate the minimum singular values for the first and second scenario respectively. Both figures represent the minimum singular values using a logarithmic measure $$10^{10}\log(s+10^{-20}),$$

in which s is the minimum singular value of the observability matrix and the second term is introduced to avoid numerical issues by ensuring the measure returns values larger than −200. A measure that equal −200 indicates that the system is not observable, whereas values larger than −200 indicate that the system is observable.

FIG. 5a shows that the measure equals −200 for all positions when two base stations are used. However, when three (not co-located) base stations are used, as in FIG. 5b, the measure is greater than −200. Thus, the system is not observable if two base stations are used, but the system is observable if three or more base stations are used. Accordingly, it is possible to determine a two-dimensional position (and velocity) of a moving wireless device using only CFO measurements for signals sent between the moving wireless device and three or more base stations.

In particular examples, it may be preferable to obtain and use CFO measurements for four or more base stations. This may be particularly relevant in embodiments in which the CFO bias is also determined based on the CFO measurements. In general, increasing the number of base stations increases the observability of the system. Moreover, the observability of the system increases as the distance between the UAV and the respective base stations decreases, which reflects the geometric properties of the estimation problem at hand.

For the purpose of illustrating the operation and performance of embodiments of the present disclosure, the performance of a position estimator operating according to examples disclosed herein has been simulated.

FIGS. 6-13 relate to a simulation of a wireless device moving in two-dimensions according to embodiments of the present disclosure. The parameters of the IMM estimator used to determine the kinematic state of the simulated wireless device are given in Table 1.

TABLE 1

| Parameter | Description | Value |
|---|---|---|
| $r^i$ | The assumed Doppler shift measurement standard deviation of mode i. Note: In case measurement SNR is estimated and signaled, $r^i$ may be set to the corresponding Doppler shift standard deviation value, for each measurement. | 5.0 Hz |
| $\sqrt{q_{11}^1}$ | Low bandwidth constant velocity mode acceleration systems noise. | 4.0 m/s² |
| $\sqrt{q_{22}^1}$ | Low bandwidth constant velocity mode acceleration systems noise. | 4.0 m/s² |
| $\sqrt{q_{11}^2}$ | High bandwidth constant velocity mode acceleration systems noise. | 25.0 m/s² |
| $\sqrt{q_{22}^2}$ | High bandwidth constant velocity mode acceleration systems noise. | 25.0 m/s² |
| $\sqrt{q_{bias}}$ | UE Doppler drift rate systems noise. | 1/180 Hz/s |
| $\lambda_{11}$ | The mode switch rate 1→1 | −0.20 s⁻¹ |
| $\lambda_{22}$ | The mode switch rate 2→2 | −0.10 s⁻¹ |

The trajectory of the simulated moving UAV was generated using numerical integration. In order to obtain asynchronous CFO measurements, each base station is assigned a sampling period having an average component and a random component. The CFO bias is set to 70 Hz. The simulated CFO measurements for each base station were obtained by interpolating a kinematic state (e.g. position and velocity) of the UAV to the measurement time of the base station, and then applying the nonlinear measurement equation (as described above), subject to additional random noise. CFO measurements from seven base stations were used, with the positions of the base stations given below:

$$S_1 = (200\ 100\ 5)^T m,$$

$$S_2 = (100\ 40\ 110)^T m,$$

$$S_3 = (800\ -50\ 70)^T m,$$

$$S_4 = (500\ -100\ 50)^T m,$$

$$S_5 = (50\ 200\ 180)^T m,$$

$$S_6 = (0\ 245\ 60)^T m,$$

$$S_7 = (-50\ 0\ 75)^T m.$$

The performance of the position estimator was evaluated using a number of combinations of Doppler shift measurement standard deviations and sampling periods.

Figure 6:
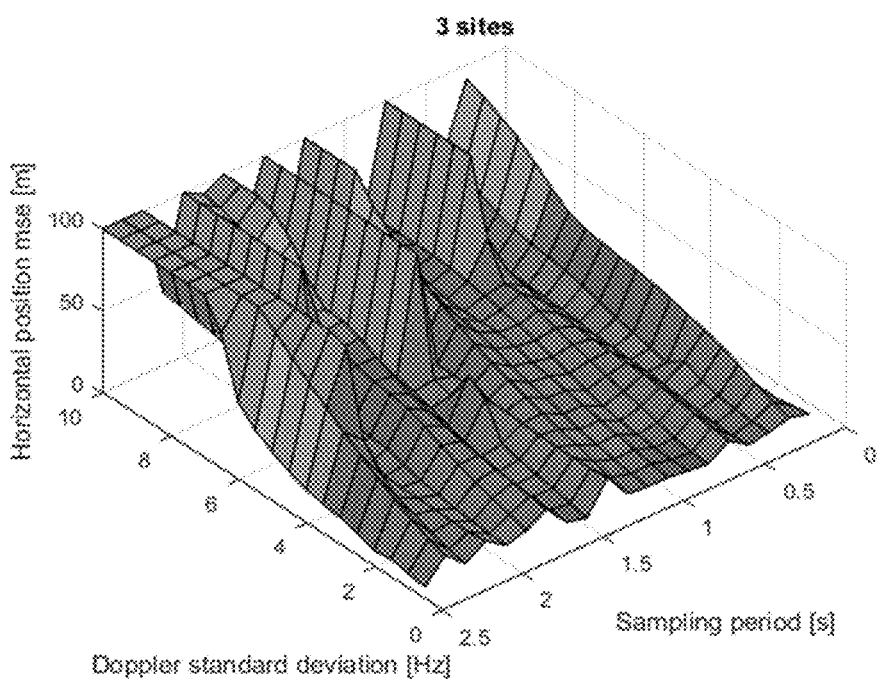
FIG. 6 shows a variation in mean square error for horizontal position estimates for a simulation of a moving wireless device.
Figure 7:
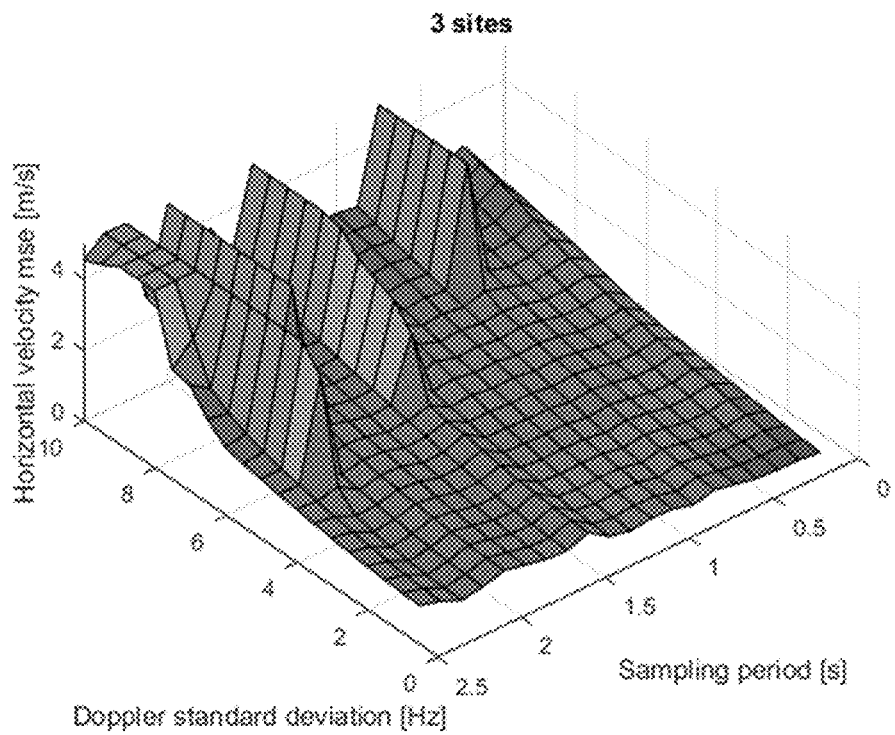
FIG. 7 shows a variation in mean square error for horizontal velocity estimates for a simulation of a moving wireless device.
Figure 8:
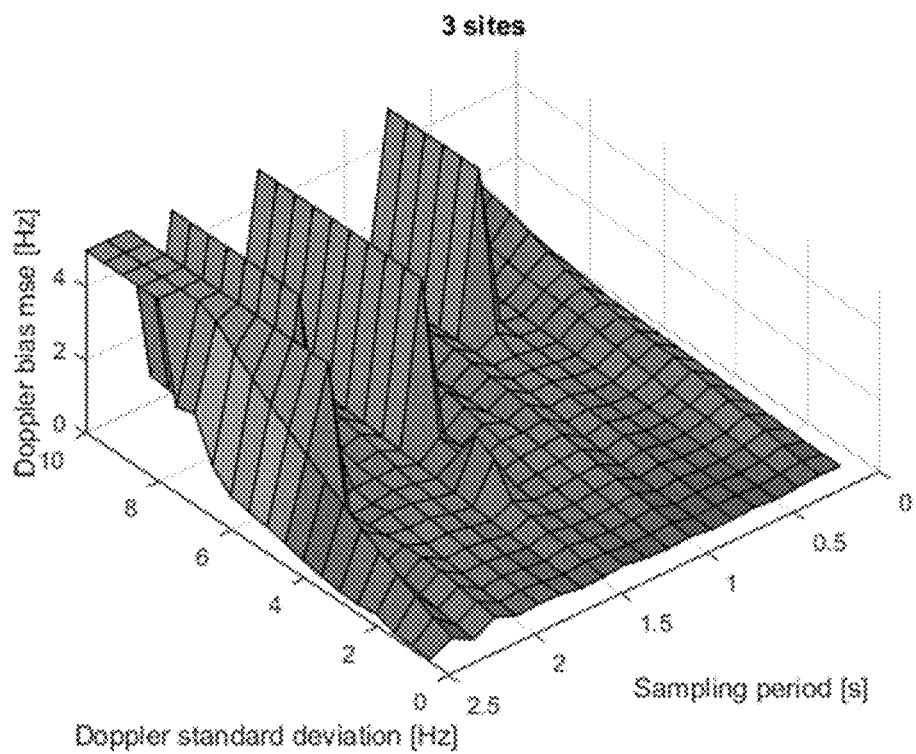
FIG. 8 shows a variation in mean square error for carrier frequency offset bias estimates for a simulation of a moving wireless device.

The results are shown in FIGS. 6-8, which show the horizontal position mean square error (mse), horizontal velocity mse and Doppler bias (CFO bias) mse respectively. From these figures it is apparent that the accuracy of the position, velocity and CFO bias estimates seems to be more sensitive to the accuracy of the CFO (Doppler) shift measurements than the sampling period. These figures also demonstrate that the method performs well for a large range of measurement inaccuracies. Position mse below 25 m and velocity mse below 1.5 m/s are achievable for a range of combinations of sampling periods and CFO measurement accuracies.

Figure 9:
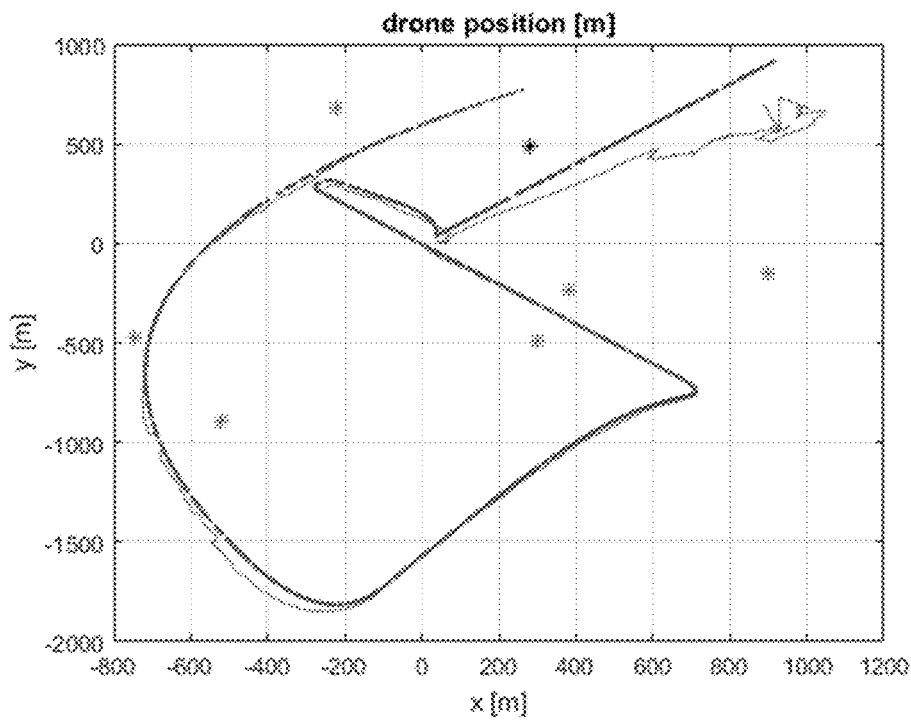
FIG. 9 shows a simulated trajectory and an estimated trajectory of a moving wireless device in the simulation according to embodiments of the disclosure.
Figure 10:
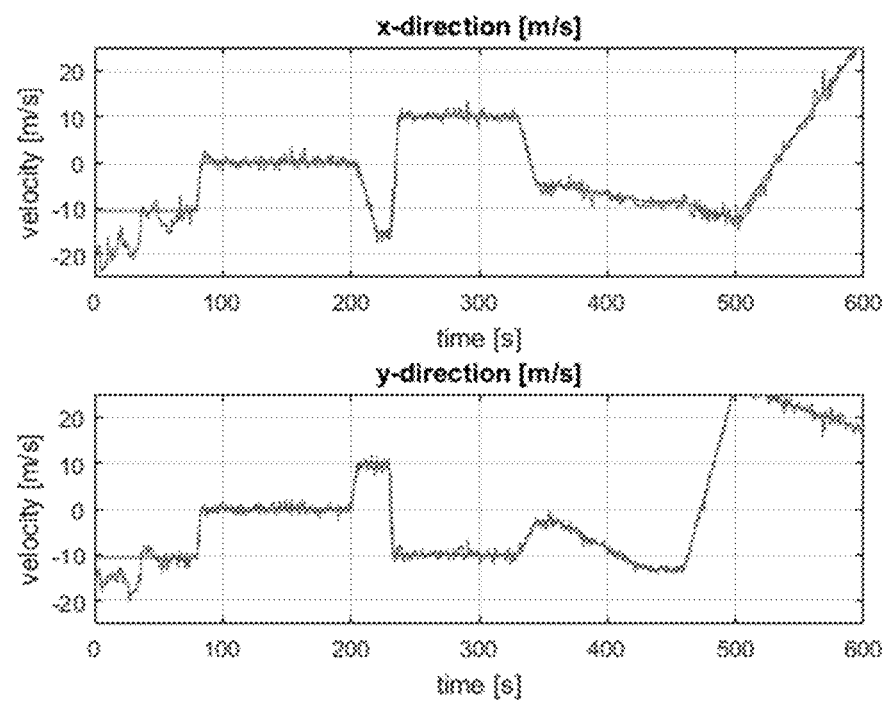
FIG. 10 shows velocities and estimated velocities of a moving wireless device in the simulation according to embodiments of the disclosure.
Figure 11:
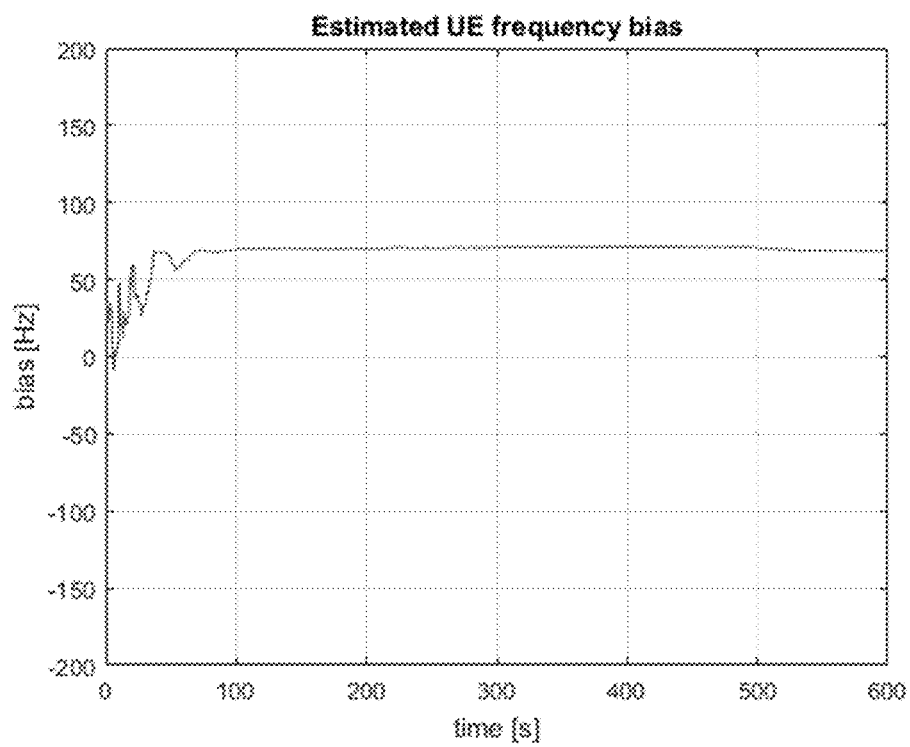
FIG. 11 shows estimates of carrier frequency offset bias in the simulation according to embodiments of the disclosure.

FIG. 9 shows a measured trajectory and an estimated trajectory for the simulation of a moving wireless device according to embodiments of the disclosure. The positions of the base stations are represented by asterisks in FIG. 9. The corresponding measured velocity and estimated velocity in the x and y directions are shown in FIG. 10. The variation in the CFO bias determined using methods described herein is shown in FIG. 11.

Figure 12:
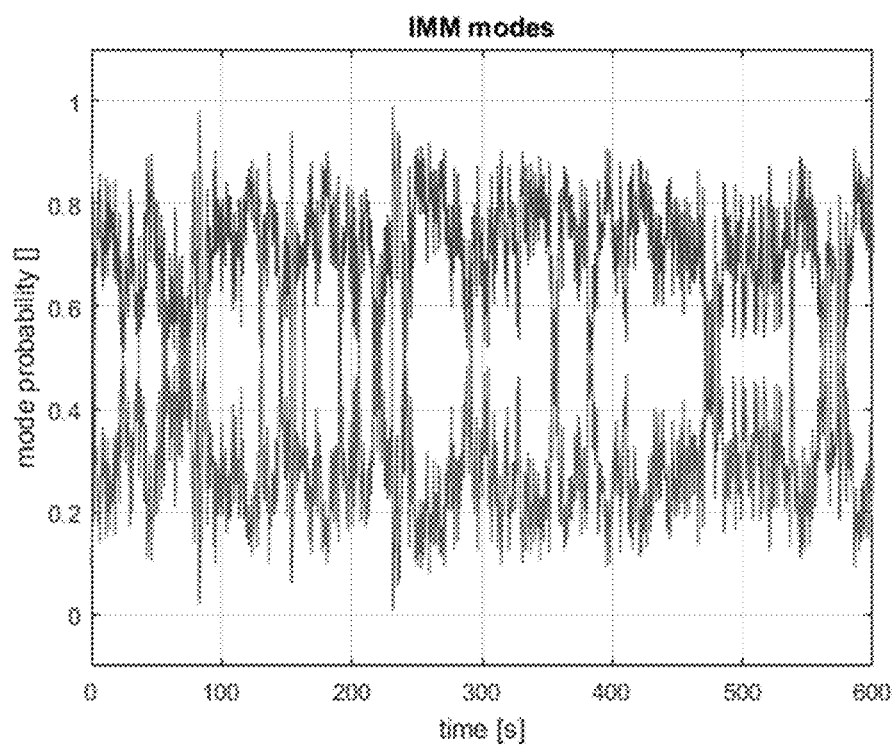
FIG. 12 shows probabilities of a moving wireless device being in first and second movement modes in the simulation according to embodiments of the disclosure.

FIG. 12 shows a variation in a mode probability for a first movement mode and a second movement mode, as described above (e.g. two movement modes with a two-dimensional velocity and an acceleration noise, in which the acceleration noise for one of the modes is larger than the acceleration noise for the other mode).

Figure 13:
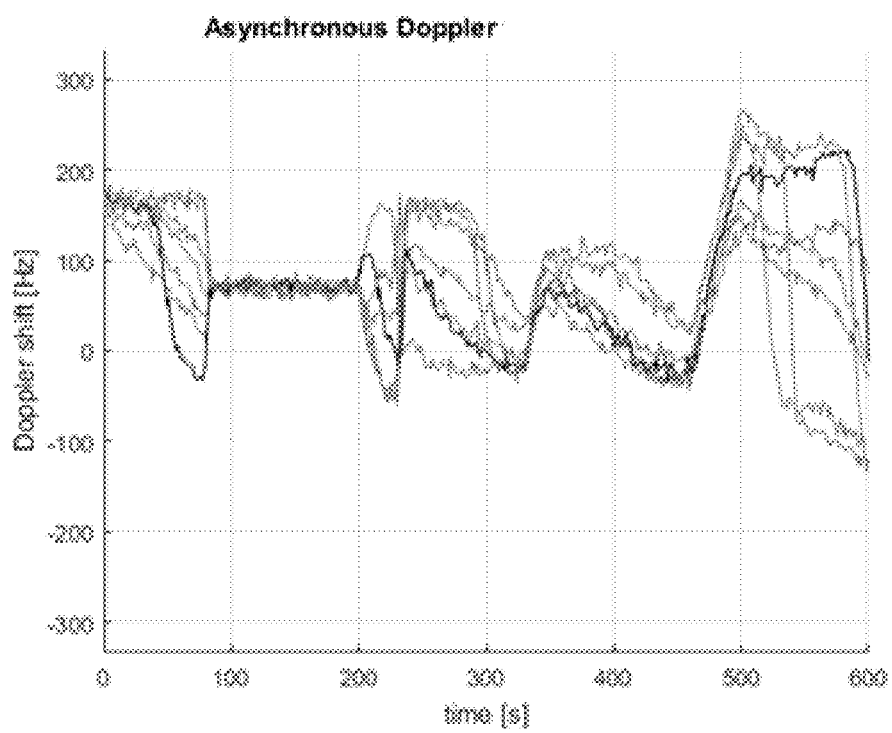
FIG. 13 shows carrier frequency offset measurements in the simulation according to embodiments of the disclosure.

FIG. 13 shows the CFO measurements (labelled as Doppler shift) for the seven base stations, in which each line shows CFO measurements for a respective base station in the seven base stations.

FIGS. 8 and 9 in particular demonstrate that the trajectory (e.g. the variation in two-dimensional position and velocity) of a moving wireless device may be monitored using only CFO measurements performed on signals sent between the moving wireless device and seven or more base stations. As described above, the methods described herein may be used more generally for systems comprising three or more base stations.

Embodiments of the present disclosure thus provide methods for determining a two-dimensional kinematic state (e.g. a two-dimensional position) of a moving wireless device using CFO measurements for the wireless device with respect to three or more base stations.

The present disclosure further provides a signalling protocol for sending CFO measurements in a communications network. As described above, the positioning methods described herein may be performed by a node in a core network, such as the positioning node 206 described above in respect of FIG. 2. The CFO measurements that are used in the method (e.g. those obtained in step 302 in method 300 described in respect of FIG. 3) may be performed by, for example, the three or more base stations or by the moving wireless device. However, current signalling protocols may not provide any mechanism for receiving the CFO measurements at the positioning node from one or more nodes performing the measurements (e.g. from the three or more base stations or from the moving wireless device). This may be particularly relevant in Long Term Evolution (LTE) or New Radio (NR) networks, in which the LPPa protocol may be used between a base station (e.g. an eNB) and a positioning node, and/or the LPP protocol may be used between a wireless device (e.g. a user equipment) and the positioning node.

Aspects of the present disclose thus provide an enhanced protocol in which information may be sent from a node performing one or more CFO measurements for a moving wireless device (e.g. a base station, such as a base station in a radio access network, or the wireless device itself) to a positioning node (e.g. a positioning node in a core network).

Figure 14:
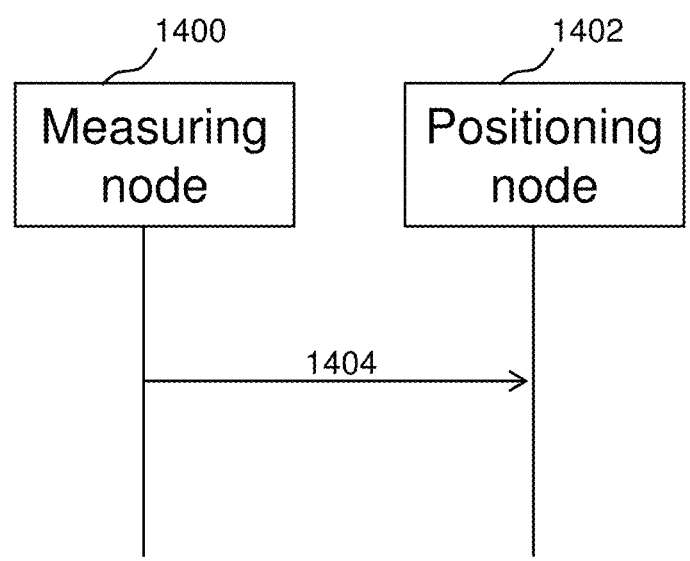
FIG. 14 shows an exemplary signalling procedure according to embodiments of the disclosure.

An exemplary signalling procedure for sending this information is shown in FIG. 14, which shows a measuring node 1400 sending a message 1404 to a positioning node 1402. The measuring node is a node that performs one or more CFO measurements for a moving wireless device (e.g. the moving wireless device 202 described above in respect of FIG. 2). The measuring node may be, for example, a base station (such as one of the base stations 204 described above in respect of FIG. 2) or the moving wireless device itself. The message 1404 comprises one or more of the following:

- an indication of one or more CFO measurements performed by the node (e.g. with a resolution of 0.1-1 Hz);
- an identifier for the node performing the one or more CFO measurements (e.g. an ID for a base station or wireless device and/or, for a base station, World Geodetic System 84, WGS 84, coordinates for the site of the base station);
- a time at which the one or more CFO measurements were made (e.g. in global time standard for a radio access network comprising the site); and
- a CFO measurement standard deviation (e.g. with a resolution of 0.1-1 Hz).

The message 1404 may be received at the positioning node 1402 as part of obtaining the CFO measurements in step 302 described above in respect of FIG. 3.

The message 1404 may be sent according to an enhancement to an existing protocol. For example, an existing LPPa protocol or LPP protocol (e.g. in LTE) may be enhanced to include one or more of the above as information elements. In particular examples, multiple CFO measurements may be sent in a single message, such as the message 1404. Any such message may be associated with, for example, one or more of: a reporting type identifier, a message type identifier and a number of reported CFO measurements included in the message.

In some examples, a New Radio protocol (e.g. a 5G protocol) may include one or more of the above as information elements. Thus, for example, a protocol between a gNB and a positioning node in New Radio (e.g. an LPPa protocol) may include one or more of the above as information elements. In another example, a protocol between a wireless device and a positioning node in New Radio (e.g. an LPP protocol) may include one or more of the above as information elements. In both examples, multiple CFO measurements may be sent in a single message. Any such message may be associated with, for example, one or more of: a reporting type identifier, a message type identifier and a number of reported CFO measurements included in the message.

Although FIG. 14 shows only a single message being sent from the measuring node 1400 to the positioning node 1402, the skilled person will appreciate that, in general, the information referred to above may be sent from the measuring node 1400 to the positioning node 1402 in one or more messages.

Figure 15:
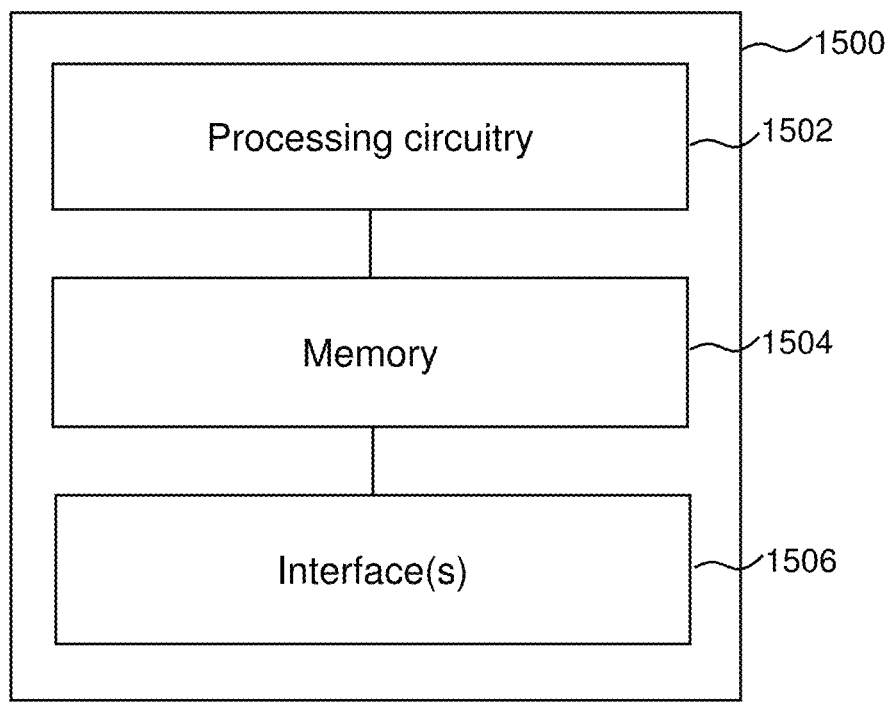
FIGS. 15 and 16 are schematic diagrams of apparatuses according to embodiments of the disclosure.

FIG. 15 is a schematic diagram of an apparatus 1500 for determining a two-dimensional position of a moving wireless device according to embodiments of the disclosure. The apparatus 1500 may be, for example, a base station (such as any of the base stations 204a, 204b, 204c described above in respect of FIG. 2) or a node in a core network of a communications network or connected to such a core network. For example, the apparatus 1500 may be the position estimator 206 described above in respect of FIG. 2.

The apparatus 1500 may be operable to carry out the example method 300 described with reference to FIG. 3 and possibly any other processes or methods disclosed herein. It is also to be understood that the method 300 of FIG. 3 may not necessarily be carried out solely by the apparatus 1500. At least some operations of the method can be performed by one or more other entities.

The apparatus 1500 comprises processing circuitry 1502 (such as one or more processors, digital signal processors, general purpose processing units, etc), a machine-readable medium 1504 (e.g., memory such as read-only memory (ROM), random-access memory, cache memory, flash memory devices, optical storage devices, etc) and one or more interfaces 1506.

In one embodiment, the machine-readable medium 1504 stores instructions which, when executed by the processing circuitry 1502, cause the apparatus 1500 to: obtain, for each of three or more base stations, one or more measurements of a CFO for one or more signals sent between the moving wireless device and the respective base station. The apparatus 1500 is further caused to input the CFO measurements into a model to determine a two-dimensional position of the wireless device. Inputs to the model do not include range measurements of the wireless device with respect to the three or more base stations.

In other embodiments, the processing circuitry 1502 may be configured to directly perform the method, or to cause the apparatus 1500 to perform the method, without executing instructions stored in the non-transitory machine-readable medium 1504, e.g., through suitably configured dedicated circuitry.

The one or more interfaces 1506 may comprise hardware and/or software suitable for communicating with other nodes of the communication network using any suitable communication medium. For example, the interfaces 1506 may comprise one or more wired interfaces, using optical or electrical transmission media. Such interfaces may therefore utilize optical or electrical transmitters and receivers, as well as the necessary software to encode and decode signals transmitted via the interface. In a further example, the interfaces 1506 may comprise one or more wireless interfaces. Such interfaces may therefore utilize one or more antennas, baseband circuitry, etc. The components are illustrated coupled together in series; however, those skilled in the art will appreciate that the components may be coupled together in any suitable manner (e.g., via a system bus or suchlike).

In further embodiments of the disclosure, the apparatus 1500 may comprise power circuitry (not illustrated). The power circuitry may comprise, or be coupled to, power management circuitry and is configured to supply the components of apparatus 1500 with power for performing the functionality described herein. Power circuitry may receive power from a power source. The power source and/or power circuitry may be configured to provide power to the various components of apparatus 1500 in a form suitable for the respective components (e.g., at a voltage and current level needed for each respective component). The power source may either be included in, or external to, the power circuitry and/or the apparatus 1500. For example, the apparatus 1500 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 1:
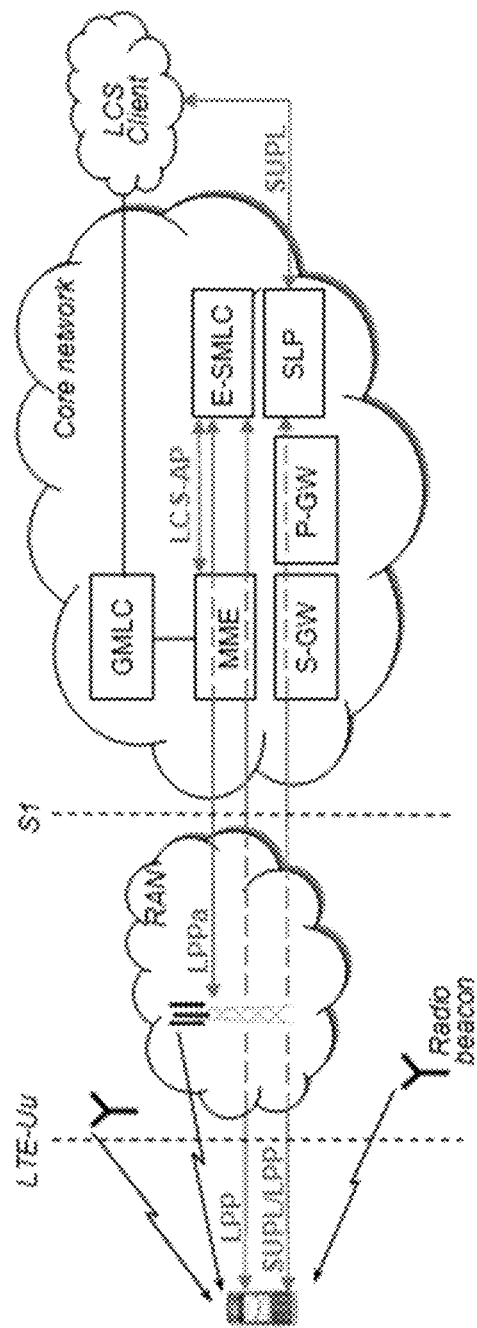
FIG. 1 shows an exemplary architecture for positioning in a Long Term Evolution network.
Figure 16:
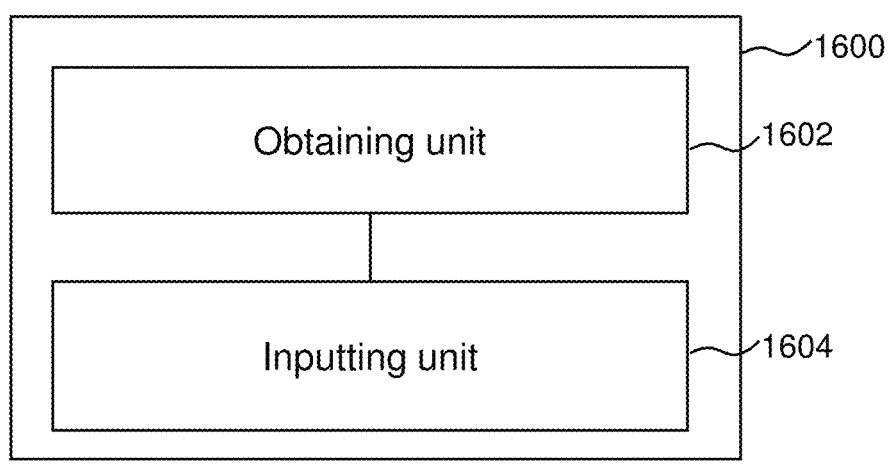

FIG. 16 is a schematic diagram of an apparatus 1600 for determining a two-dimensional position of a moving wireless device according to embodiments of the disclosure. The apparatus 1600 may be, for example, a base station (such as any of the base stations 204a, 204b, 204c described above in respect of FIG. 2) or a node in a core network of a communications network or connected to such a core network. For example, the apparatus 1600 may be the position estimator 206 described above in respect of FIG. 1.

The apparatus 1600 comprises an obtaining unit 1602, which is configured to obtain, for each of three or more base stations, one or more measurements of a CFO for one or more signals sent between the moving wireless device and the respective base station. The apparatus 1600 further comprises an inputting unit 1604, which is configured to input the CFO measurements into a model to determine a two-dimensional position of the wireless device, wherein inputs to the model do not include range measurements of the wireless device with respect to the three or more base stations. Thus, for example, the obtaining unit 1502 and the inputting unit 1504 may be configured to perform steps 302 and 304 (described above in respect of FIG. 3) respectively.

The apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining unit 1602 and inputting unit 1604, and any other suitable units of apparatus 1600 to perform corresponding functions according one or more embodiments of the present disclosure.

The apparatus 1600 may additionally comprise power-supply circuitry (not illustrated) configured to supply the apparatus 1600 with power.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of determining a two-dimensional position of a moving wireless device, the method comprising:
   obtaining, for each of three or more base stations, one or more measurements of a carrier frequency offset, CFO, for one or more signals sent between the moving wireless device and the respective base stations; and
   inputting the CFO measurements into a model to determine a two-dimensional position of the moving wireless device, wherein inputs to the model do not include range measurements for the moving wireless device with respect to the three or more base stations.

2. The method of claim 1, wherein the CFO measurements are the only measurements that are input to the model that are indicative of a position of the moving wireless device.

3. The method of claim 1, wherein inputting the CFO measurements into the model comprises inputting the CFO measurements into an extended Kalman filter to determine a two-dimensional position of the moving wireless device.

4. The method of claim 3, wherein the moving wireless device is modelled as being in one of a plurality of movement modes, each of the plurality of movement modes being associated with a respective extended Kalman filter in a plurality of extended Kalman filters, the method further comprising:
   inputting the CFO measurements into the plurality of extended Kalman filters; and
   combining one or more outputs of the plurality of extended Kalman filters to determine a two-dimensional position of the moving wireless device using an interacting-multiple-model, IMM, filtering process.

5. The method of claim 4, wherein the plurality of movement modes comprises a first state model driven by a first Wiener process and a second state model driven by a second Wiener process, in which the second Wiener process represents a larger acceleration noise than the first Wiener process.

6. The method of claim 5, wherein each state model comprises a CFO bias state, representing at least a clock offset indicating a difference in sampling frequency between the moving wireless device and the three or more base stations.

7. The method of claim 6, wherein the three or more base stations comprise four or more base stations and inputting the CFO measurements into a model to determine a two-dimensional position of the moving wireless device comprises inputting the CFO measurements into a model to determine a two-dimensional position of the moving wireless device and the CFO bias.

8. The method of claim 4, wherein at least two of the CFO measurements are performed at different times and wherein combining one or more outputs of the plurality of extended Kalman filters using an IMM filtering process comprises sampling a continuous-time mode transition model that is parametrised in terms of a time between CFO measurements.

9. The method of claim 1, wherein inputting the CFO measurements into the model comprises inputting the CFO measurements into a particle filter to determine a two-dimensional position of the moving wireless device.

10. The method of claim 1, further comprising performing said method for the moving wireless device at each of a plurality of time instances to monitor a trajectory of the moving wireless device.

11. The method of claim 1, wherein the one or more signals comprise one or more uplink signals sent by the moving wireless device, and the CFO measurements for each of the three or more base stations are performed by the respective base station on the one or more uplink signals.

12. The method of claim 1, wherein the three or more base stations comprise a serving base station, wherein the one or more signals are sent to and received by the serving base station from the moving wireless device, and wherein base stations other than the serving base station eavesdrop on the one or more signals.

13. The method of claim 1, wherein the method is performed by a serving base station for the moving wireless device.

14. The method of claim 1, wherein the method is performed by a positioning node, the CFO measurements are performed by the three or more base stations, and:
    obtaining the one or more measurements of the CFO offset comprises receiving, from the three or more base stations, the CFO measurements and preferably one or more of the following:
        an identifier for the base stations;
        a time at which the one or more CFO measurements were made; and
        a CFO measurement standard deviation.

15. The method of claim 1, wherein the method is performed by a positioning node, the CFO measurements are performed by the moving wireless device, and:
    obtaining the one or more measurements of the CFO offset comprises receiving, from the moving wireless device, the CFO measurements and preferably one or more of the following:
        an identifier for the moving wireless device;
        a time at which the one or more CFO measurements were made; and
        a CFO measurement standard deviation.

16. An apparatus configured to perform the method of claim 1.

17. A computer program comprising instructions which, when executed on at least one processor, cause the at least one processor to carry out a method according to claim 1.

18. A carrier containing a computer program according to claim 17, wherein the carrier comprises one of an electronic signal, optical signal, radio signal or machine-readable storage medium.

19. An apparatus for determining a two-dimensional position of a moving wireless device, the apparatus comprising processing circuitry and a non-transitory machine-readable medium storing instructions which, when executed by the processing circuitry, cause the apparatus to:
    obtain, for each of three or more base stations, one or more measurements of a carrier frequency offset, CFO, for one or more signals sent between the moving wireless device and the respective base stations; and
    input the CFO measurements into a model to determine a two-dimensional position of the moving wireless device, wherein inputs to the model do not include range measurements for the moving wireless device with respect to the three or more base stations.

20. The apparatus of claim 19, wherein the CFO measurements are the only measurements that are input to the model that are indicative of a position of the moving wireless device.

* * * * *